United States Patent
Ninomiya et al.

(10) Patent No.: US 9,894,391 B2
(45) Date of Patent: Feb. 13, 2018

(54) DISTRIBUTION MANAGEMENT APPARATUS, DISTRIBUTION METHOD, AND PROGRAM

(71) Applicants: Masaki Ninomiya, Kanagawa (JP); Kiyoshi Kasatani, Kanagawa (JP); Yasuhiro Kuba, Kanagawa (JP); Masahiro Kuwata, Tokyo (JP); Haruo Shida, Kanagawa (JP); Kenji Namie, Kanagawa (JP); Atsushi Okada, Kanagawa (JP); Katsuyuki Omura, Tokyo (JP)

(72) Inventors: Masaki Ninomiya, Kanagawa (JP); Kiyoshi Kasatani, Kanagawa (JP); Yasuhiro Kuba, Kanagawa (JP); Masahiro Kuwata, Tokyo (JP); Haruo Shida, Kanagawa (JP); Kenji Namie, Kanagawa (JP); Atsushi Okada, Kanagawa (JP); Yohsuke Kusumi, Aichi (JP); Katsuyuki Omura, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/024,577

(22) PCT Filed: Sep. 4, 2014

(86) PCT No.: PCT/JP2014/073403
§ 371 (c)(1),
(2) Date: Mar. 24, 2016

(87) PCT Pub. No.: WO2015/045788
PCT Pub. Date: Apr. 2, 2015

(65) Prior Publication Data
US 2016/0241891 A1   Aug. 18, 2016

(30) Foreign Application Priority Data

Sep. 26, 2013   (JP) .................................. 2013-200553

(51) Int. Cl.
*H04N 21/2343*   (2011.01)
*H04N 21/2381*   (2011.01)
(Continued)

(52) U.S. Cl.
CPC .   *H04N 21/234345* (2013.01); *H04N 21/2343* (2013.01); *H04N 21/2381* (2013.01);
(Continued)

(58) Field of Classification Search
None
See application file for complete search history.

(56) References Cited

U.S. PATENT DOCUMENTS

2008/0254740 A1 * 10/2008 Tofigh ................ H04N 7/17327
455/3.01
2010/0053443 A1 *  3/2010 Tsukagoshi ........... G06T 3/4038
348/581
(Continued)

FOREIGN PATENT DOCUMENTS

EP   2 610 735 A1   7/2013
GB   2478651 A   9/2011
(Continued)

OTHER PUBLICATIONS

International Search Report dated Oct. 28, 2014 in PCT/JP2014/073403 filed on Sep. 4, 2014.
(Continued)

*Primary Examiner* — Omar S Parra
(74) *Attorney, Agent, or Firm* — Oblon, McClelland, Maier & Neustadt, L.L.P.

(57) ABSTRACT

A distribution management apparatus includes a generator configured to generate still-picture data from content data, a
(Continued)

converter configured to convert the still-picture data into video data, and a distributer configured to distribute the video data to each of a first communication terminal and a second communication terminal, which are capable of playing back and displaying the video data. When first operation data indicating an operation of zooming into a partial region of the video data being played back and displayed on the first communication terminal is transmitted, the converter generates video data representing a partial region, which depends on display/playback capabilities of the second communication terminal, of the video data being played back and displayed on the first communication terminal, and the distributer distributes the video data representing the partial region generated by the converter to the second communication terminal.

6 Claims, 22 Drawing Sheets

(51) Int. Cl.
| H04N 21/6587 | (2011.01) |
| H04N 21/2387 | (2011.01) |
| H04N 21/431 | (2011.01) |
| H04N 21/436 | (2011.01) |
| H04N 21/4363 | (2011.01) |
| H04N 21/4402 | (2011.01) |
| H04N 21/4782 | (2011.01) |

(52) U.S. Cl.
CPC ..... *H04N 21/2387* (2013.01); *H04N 21/4316* (2013.01); *H04N 21/4363* (2013.01); *H04N 21/43615* (2013.01); *H04N 21/440263* (2013.01); *H04N 21/4782* (2013.01); *H04N 21/6587* (2013.01)

(56) References Cited

U.S. PATENT DOCUMENTS

| 2011/0225544 | A1 | 9/2011 | Demar et al. |
| 2011/0299832 | A1* | 12/2011 | Butcher ........... H04N 21/23431 |
| | | | 386/248 |
| 2013/0135346 | A1 | 5/2013 | Sakuramata et al. |
| 2013/0162501 | A1 | 6/2013 | Tsuda et al. |
| 2013/0162502 | A1 | 6/2013 | Lee et al. |
| 2014/0280446 | A1 | 9/2014 | Kasatani |
| 2014/0280458 | A1 | 9/2014 | Kasatani |
| 2014/0280722 | A1 | 9/2014 | Kasatani |
| 2014/0280725 | A1 | 9/2014 | Kasatani |
| 2014/0280777 | A1 | 9/2014 | Kasatani |
| 2014/0282039 | A1 | 9/2014 | Kasatani |
| 2014/0282778 | A1 | 9/2014 | Kasatani |
| 2014/0282793 | A1 | 9/2014 | Kasatani |
| 2014/0282794 | A1 | 9/2014 | Kasatani |
| 2015/0268822 | A1* | 9/2015 | Waggoner ............. G06F 3/0488 |
| | | | 715/722 |
| 2016/0014193 | A1 | 1/2016 | Kasatani |
| 2016/0021405 | A1 | 1/2016 | Kasatani |
| 2016/0037193 | A1 | 2/2016 | Kasatani |
| 2016/0044079 | A1 | 2/2016 | Kasatani |

FOREIGN PATENT DOCUMENTS

| JP | 2002-268969 | 9/2002 |
| JP | 2009-049528 | 3/2009 |
| JP | 2009-200937 | 9/2009 |
| WO | WO 2014/142342 A1 | 9/2014 |
| WO | WO 2014/142343 A1 | 9/2014 |
| WO | WO 2014/142354 A1 | 9/2014 |
| WO | WO 2014/142358 A1 | 9/2014 |

OTHER PUBLICATIONS

Extended European Search Report dated Sep. 21, 2016 in Patent Application No. 14849323.2.

* cited by examiner

FIG.13

| CHECKBOX | SHARING ID | DISPLAY NAME |
|---|---|---|
| | v003 | TOKYO HEAD OFFICE, 10F, MFP |
| ✓ | v006 | OSAKA EXHIBITION ROOM, 1F, MULTI-DISPLAY |
| ⋮ | ⋮ | ⋮ |

DISTRIBUTION-DESTINATION SELECTION MENU

MARK CHECKBOX OF CONTENT DESTINATION AND PRESS "OK"

OK   CANCEL

FIG.14

| TERMINAL ID | USER CERTIFICATE | CONTRACT INFORMATION | TERMINAL TYPE | SETTING INFORMATION (Home URL) | EXECUTION ENVIRONMENT INFORMATION (FAVORITE) (PREVIOUS COOKIE INFORMATION) (CACHE FILE) | SHARING ID | LAY-OUT POSI-TION | RESOLUTION INFORMATION | SELECTED COORDINATE INFORMATION (START ADDRESS) | DISPLAY NAME |
|---|---|---|---|---|---|---|---|---|---|---|
| t001 | ...... | FHD,30FPS, 3-MONTH CONTRACT | NOTEBOOK PC | http://www.rocoh.co.jp | ...... | v001 | - | 1920*1080 | - | BEIJING OFFICE, 10F, TERMINAL AT RECEPTION DESK |
| t002 | ...... | HD,30FPS, 3-MONTH CONTRACT | TABLET TERMINAL | http://www.rocoh.co.jp | ...... | v002 | - | 1280*720 | - | NY OFFICE, 1F, TERMINAL AT RECEPTION DESK IN LOBBY |
| t003 | ...... | QVGA,15FPS, 6-MONTH CONTRACT | MFP | http://www.rocoh.co.jp | ...... | v003 | - | 320*240 | - | TOKYO HEAD OFFICE, 10F, MFP |
| t004 | ...... | WXGA,15FPS, 12-MONTH CONTRACT | PROJECTOR | http://www.pontax.co.jp | - | v004 | - | 1280*800 | - | TOKYO HEAD OFFICE, 1F, PROJECTOR IN LOBBY |
| t005 | ...... | WXGA,15FPS, 6-MONTH CONTRACT | CAMERA/MICROPHONE/SPEAKER | - | - | v005 | - | 1280*800 | - | NAGOYA BRANCH, 2F, TERMINAL IN TV CONFERENCE ROOM |
| t006 | ...... | FHD,30FPS, 12-MONTH CONTRACT | MULTI-DISPLAY | - | - | v006 | LEFT | 1920*1080 | - | OSAKA EXHIBITION ROOM, 1F, MULTI-DISPLAY |
| t007 | ...... | FHD,30FPS, 12-MONTH CONTRACT | MULTI-DISPLAY | - | - | v006 | MIDDLE | 1920*1080 | (600100) | OSAKA EXHIBITION ROOM, 1F, MULTI-DISPLAY |
| t008 | ...... | FHD,30FPS, 12-MONTH CONTRACT | MULTI-DISPLAY | - | - | v006 | RIGHT | 1920*1080 | (6002400) | OSAKA EXHIBITION ROOM, 1F, MULTI-DISPLAY |
| ... | ... | ... | ... | ... | ... | ... | ... | ... | ... | ... |

FIG.15

| TERMINAL ID | SHARING ID |
|---|---|
| t001 | v003 |
| t001 | v006 |
| t002 | v001 |
| ⋮ | ⋮ |

7020

DISTRIBUTION MANAGEMENT APPARATUS, DISTRIBUTION METHOD, AND PROGRAM

FIELD

The present invention relates to a distribution management apparatus, a distribution method, and a program for distributing data to communication terminals via a communication network.

BACKGROUND

A technique of dividing web content and distributing it to a plurality of terminals is conventionally known. For example, Patent Literature 1 describes dividing one page of content into a menu portion and a content portion and distributing the menu portion to a terminal, e.g., a PDA, having small display/playback capabilities and distributing the content portion to a terminal, e.g., an Internet television, having large display/playback capabilities.

SUMMARY

Technical Problem

The technique described in Patent Literature 1 allows displaying the content portion in an easy-to-view fashion when the display/playback capabilities (e.g., resolution) of the terminal, to which the content portion is distributed, are sufficiently large relative to a data size of the content portion. However, when the whole content portion is displayed in a situation where the data size of the content portion is larger than the display/playback capabilities (e.g., resolution) of the terminal, a video is zoomed out and cannot be displayed in an easy-to-view fashion.

The present invention has been made in view of the above and primarily aims at providing a distribution management apparatus, a distribution method, and a program capable of causing communication terminals to display a whole video of content and simultaneously to display a desired portion of the content in an easy-to-view fashion.

Solution to Problem

To solve the above problem and achieve the object, the present invention includes a generator configured to generate still-picture data from content data; a converter configured to convert the still-picture data into video data; and a distributer configured to distribute the video data to each of a first communication terminal and a second communication terminal, the first communication terminal and the second communication being capable of playing back and displaying the video data. When first operation data indicating an operation of zooming into a partial region of the video data being played back and displayed on the first communication terminal is transmitted, the converter generates video data representing a partial region of the video data being played back and displayed on the first communication terminal, the partial region depending on display/playback capabilities of the second communication terminal, and the distributer distributes the video data representing the partial region generated by the converter to the second communication terminal.

Advantageous Effects of Invention

According to an aspect of the present invention, it is advantageously possible to cause communication terminals to display a whole video of content and simultaneously to display a desired portion of the content in an easy-to-view fashion.

BRIEF DESCRIPTION OF DRAWINGS

FIG. 13 is a conceptual diagram of a distribution-destination selection menu screen.
FIG. 14 is a conceptual diagram of a terminal management table.
FIG. 15 is a conceptual diagram of an available-terminal management table.

DESCRIPTION OF EMBODIMENTS

An exemplary embodiment of a distribution management apparatus, distribution method, and a program according to the present invention is described in detail below with reference to the drawings. The embodiment in the following description is an application example, in which aspects of the present invention are applied to a distribution system configured to cause, by using cloud computing, a web browser (hereinafter, "browser") and an encoder to be executed in conjunction with each other on a cloud, thereby transmitting video data, audio data, and the like to communication terminals. Note that "image" used herein encompasses a still picture and moving pictures. "Video" used herein basically refers to moving pictures and also encompasses still pictures provided when moving pictures are paused. "Still picture (audio)" denotes at least one of a still picture and audio. "Image (audio)" denotes at least one of an image and audio. "Video (audio)" denotes at least one of a video and audio.

Outline of Embodiment

Figure 1:
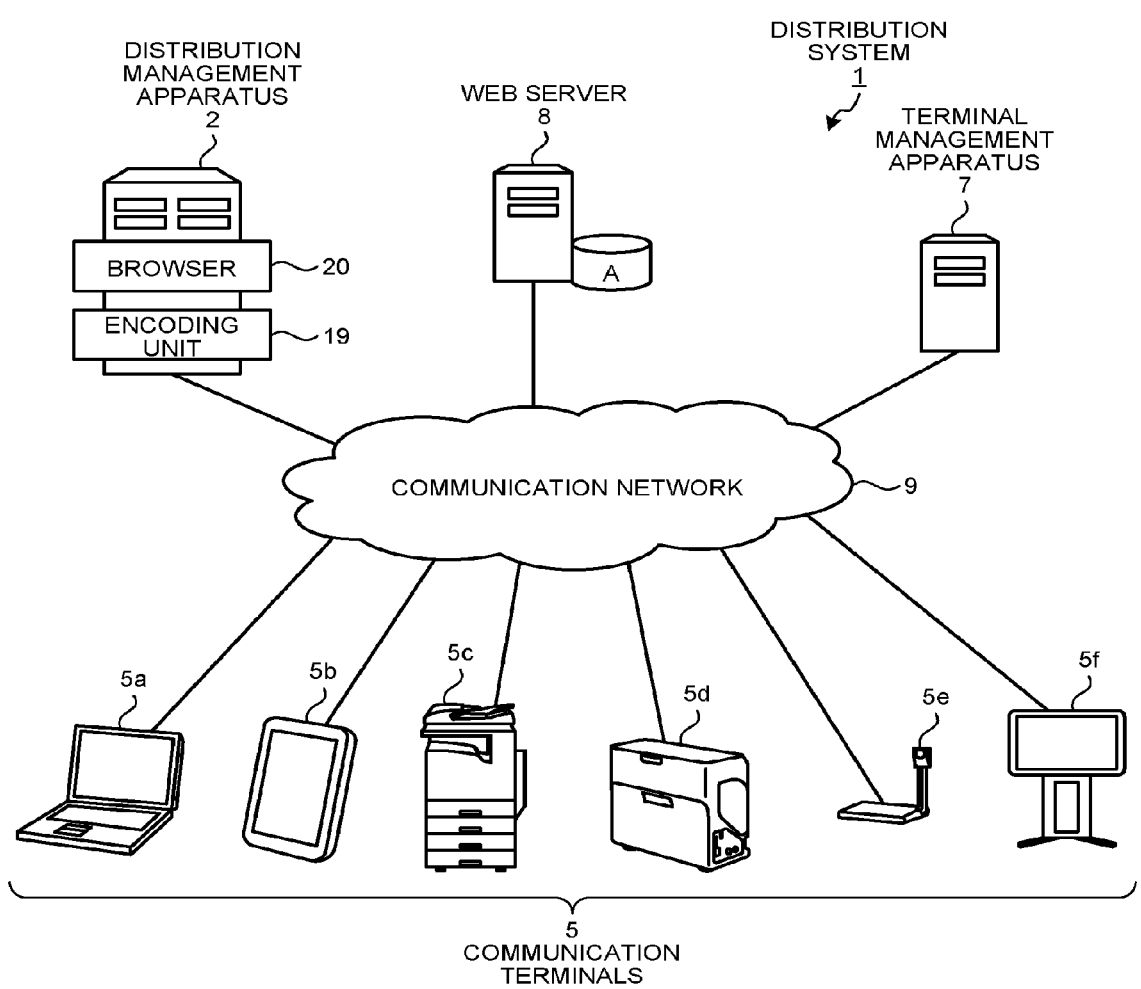
FIG. 1 is a schematic diagram of a distribution system according to a present embodiment.

An outline of the present embodiment is described first with reference to FIG. 1. FIG. 1 is a schematic diagram of a distribution system 1 according to the present embodiment.

<Outline of System Configuration>

An outline of a configuration of the distribution system 1 is described first. As illustrated in FIG. 1, the distribution system 1 according to the present embodiment is constructed including a distribution management apparatus 2, a plurality of communication terminals 5a to 5f, a terminal management apparatus 7, and a web server 8. Hereinafter, "the communication terminal 5" denotes an arbitrary one of the plurality of communication terminals 5a to 5f. Each of the distribution management apparatus 2, the terminal management apparatus 7, and the web server 8 is implemented on a server computer.

The communication terminals 5 are terminals for use by users receiving a service(s) provided by the distribution system 1. Among them, the communication terminal 5a is a notebook PC (Personal Computer). The communication terminal 5b is a mobile terminal, such as a smartphone or a tablet terminal. The communication terminal 5c is an MFP (Multifunction Peripheral/Printer/Product), in which functions of copying, scanning, printing, and facsimile are combined. The communication terminal 5d is a projector. The communication terminal 5e is a television (video) conference terminal including a camera, a microphone, and a speaker. The communication terminal 5f is a digital whiteboard (interactive whiteboard) capable of electronic conversion of a character, a shape, and the like drawn by a user or the like.

The communication terminal 5 is not limited to such a terminal as those illustrated in FIG. 1 and may alternatively be a device capable of communication via a communication network, e.g., the Internet. Examples of the device include a watch, a vending machine, a gas meter, a car navigation device, a video game console, an air conditioner, a lighting fixture, an independent camera, an independent microphone, and an independent speaker.

The distribution management apparatus 2, the communication terminals 5, the terminal management apparatus 7, and the web server 8 can communicate via a communication network 9, e.g., the Internet and a LAN (Local Area Network). The communication network 9 can include wireless communication networks including 3G (3rd Generation), WiMAX (Worldwide Interoperability for Microwave Access), and LTE (Long Term Evolution).

Figure 2:
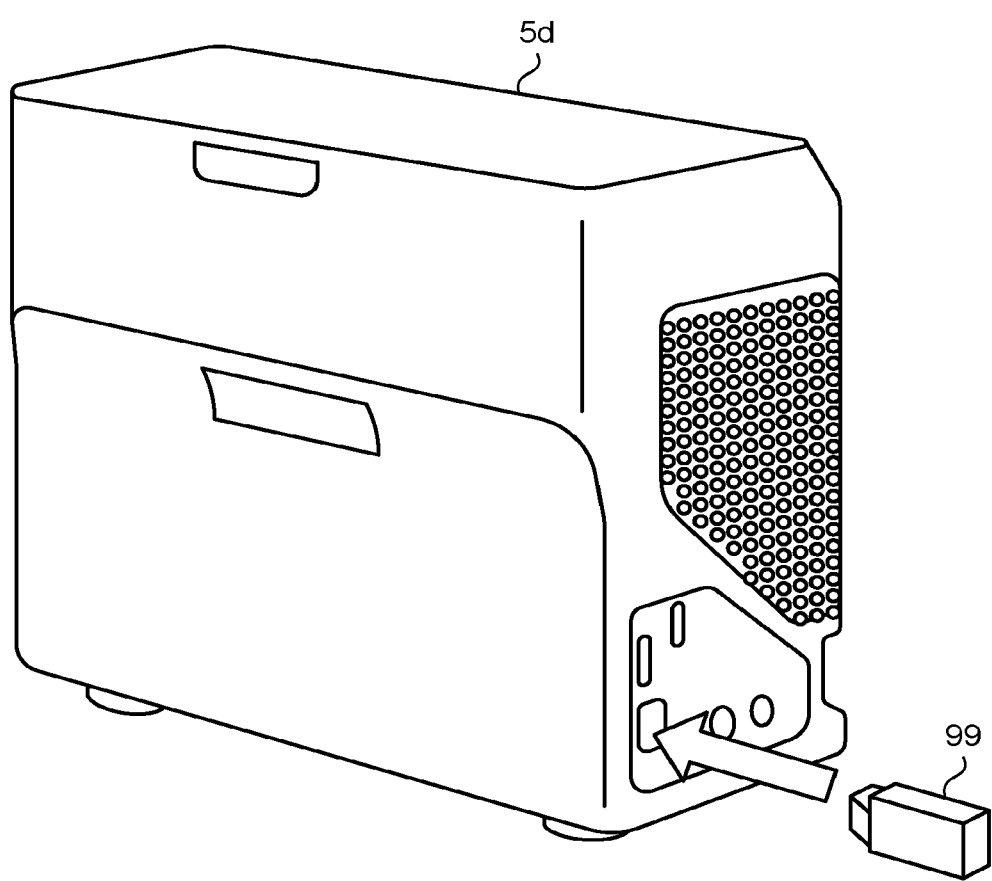
FIG. 2 is a conceptual view of attachment of a dongle to a communication terminal.

As in the case of, for example, the communication terminal 5d, some of the communication terminals 5 may not have the function of communicating with other terminals and systems via the communication network 9. However, inserting a dongle 99, by a user, into an interface portion of USB (Universal Serial Bus), HDMI (registered trademark) (High-Definition Multimedia Interface), or the like of the communication terminal 5d as illustrated in FIG. 2 enables the communication terminal 5d to communicate with other terminals and systems via the communication network 9. FIG. 2 is a conceptual view of attachment of the dongle 99 to the communication terminal.

The distribution management apparatus 2 includes, on a cloud, a browser 20. A renderer function of the browser 20 allows acquiring a single or a plurality of pieces of content data described in a predetermined description language and performing rendering, thereby generating frame data as still-picture data, such as RGB (Red, Green, and Blue) bitmap data, and audio data, such as PCM (Pulse Code Modulation) data (in short, as still-picture (audio) data). The content data is data acquired from the web server 8, an arbitrary communication terminal, or the like and includes image (audio) data in HTML (Hypertext Markup Language) or CSS (Cascading Style Sheets), image (audio) data in MP4 (MPEG-4), and audio data in AAC (Advanced Audio Coding).

The distribution management apparatus 2 further includes, on the cloud, an encoding unit 19. The encoding unit 19 performs its function as an encoder, thereby converting frame data, each piece of which is still-picture (audio) data, into video (audio) data of a compression coding format including H.264 (MPEG-4 AVC), H.265, and Motion JPEG.

The terminal management apparatus 7 performs login authentication of the communication terminal 5, management of contract information of the communication terminal 5, and the like. The terminal management apparatus 7 further has a function as an SMTP (Simple Mail Transfer Protocol) server for transmitting electronic mails. The terminal management apparatus 7 can be implemented as a virtual machine running on a cloud service (IaaS (Infrastructure as a Service)), for example. It is desirable to operate the terminal management apparatus 7 in a multiplexed manner to provide services uninterruptedly even in case of unexpected incidents.

The browser 20 of the distribution management apparatus 2 enables real-time communication (RTC (Real-time Communication/Collaboration)). Furthermore, the encoding unit 19 of the distribution management apparatus 2 can encode, in real time, the video (audio) data generated by the browser 20 to output video (audio) data generated through conversion in conformance with the H.264 standard, for example. For this reason, processing performed by the distribution management apparatus 2 differs from that performed by, for example, a DVD player that reads out non-real-time video (audio) data recorded in a DVD and distributes it.

The communication terminal 5 may include a browser as does the distribution management apparatus 2. At this time, the need for starting the browser of each of the communication terminals 5 can be eliminated by updating the browser 20 of the distribution management apparatus 2.

<Outlines of Various Distribution Methods>

Outlines of various distribution methods in the distribution system 1 of the present embodiment are described below.

Basic Distribution

Figure 3:
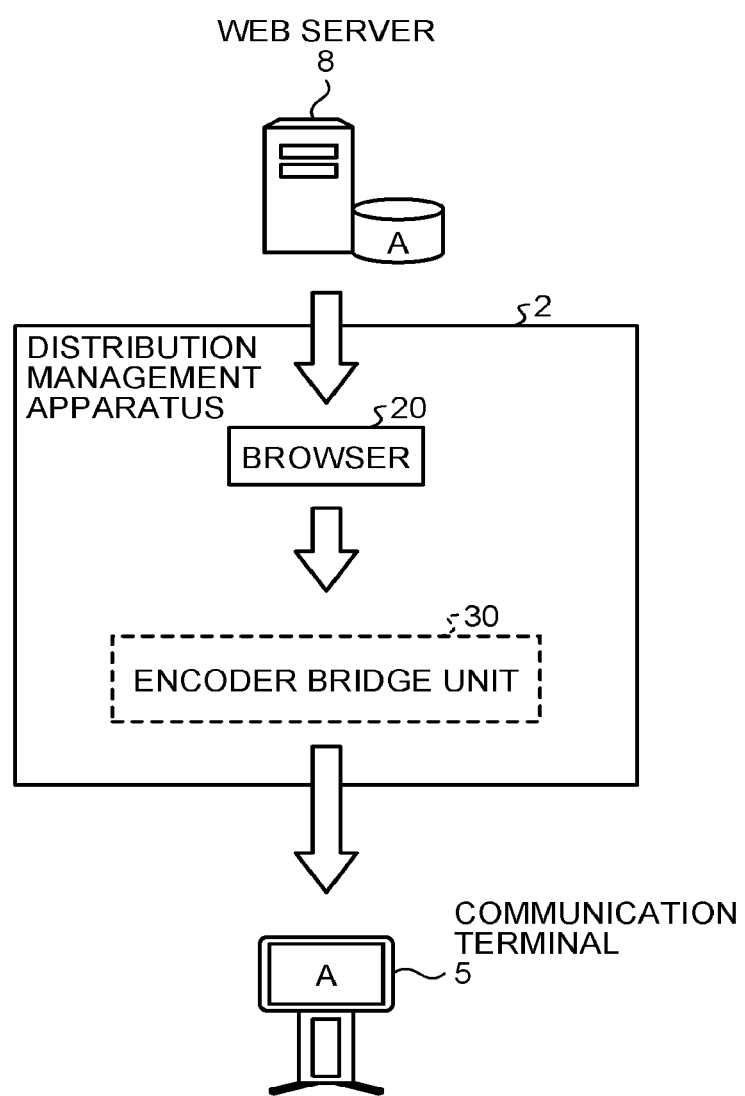
FIG. 3 is a conceptual diagram illustrating a basic distribution method.

FIG. 3 is a conceptual diagram illustrating a basic distribution method in the distribution system 1 of the present embodiment. As illustrated in FIG. 3, in the distribution system 1, the browser 20 of the distribution management apparatus 2 generates video (audio) data [A] by acquiring web content data [A] from the web server 8 and rendering it. An encoder bridge unit 30 performs encoding and the like on the video (audio) data [A] and distributes it to the communication terminal 5. Thus, even if web content generated in HTML (Hypertext Markup Language), CSS (Cascading Style Sheets), or the like is rich, the web content is distributed as video (audio) data in H.264, MPEG-4, or the like. For this reason, even if the communication terminal 5 is a low-spec communication terminal, the communication terminal 5 can play back the video (audio) data smoothly. Furthermore, the distribution system 1 of the present embodiment enables to play back latest rich web content smoothly without the need of updating a browser that provides content to the local communication terminal 5 so long as the browser 20 of the distribution management apparatus 2 is updated.

Figure 4:
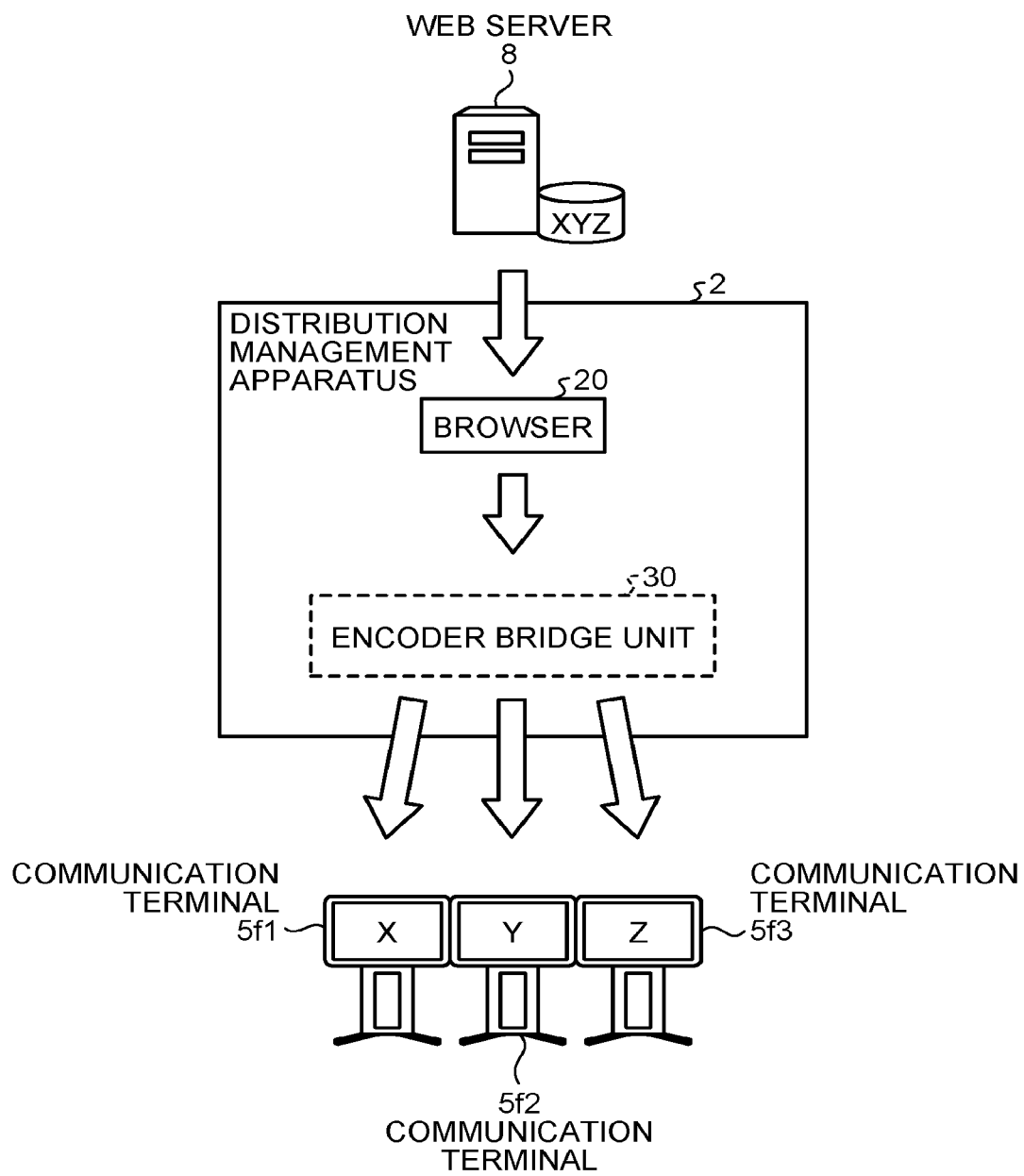
FIG. 4 is a conceptual diagram of multi-display.
Figure 5:
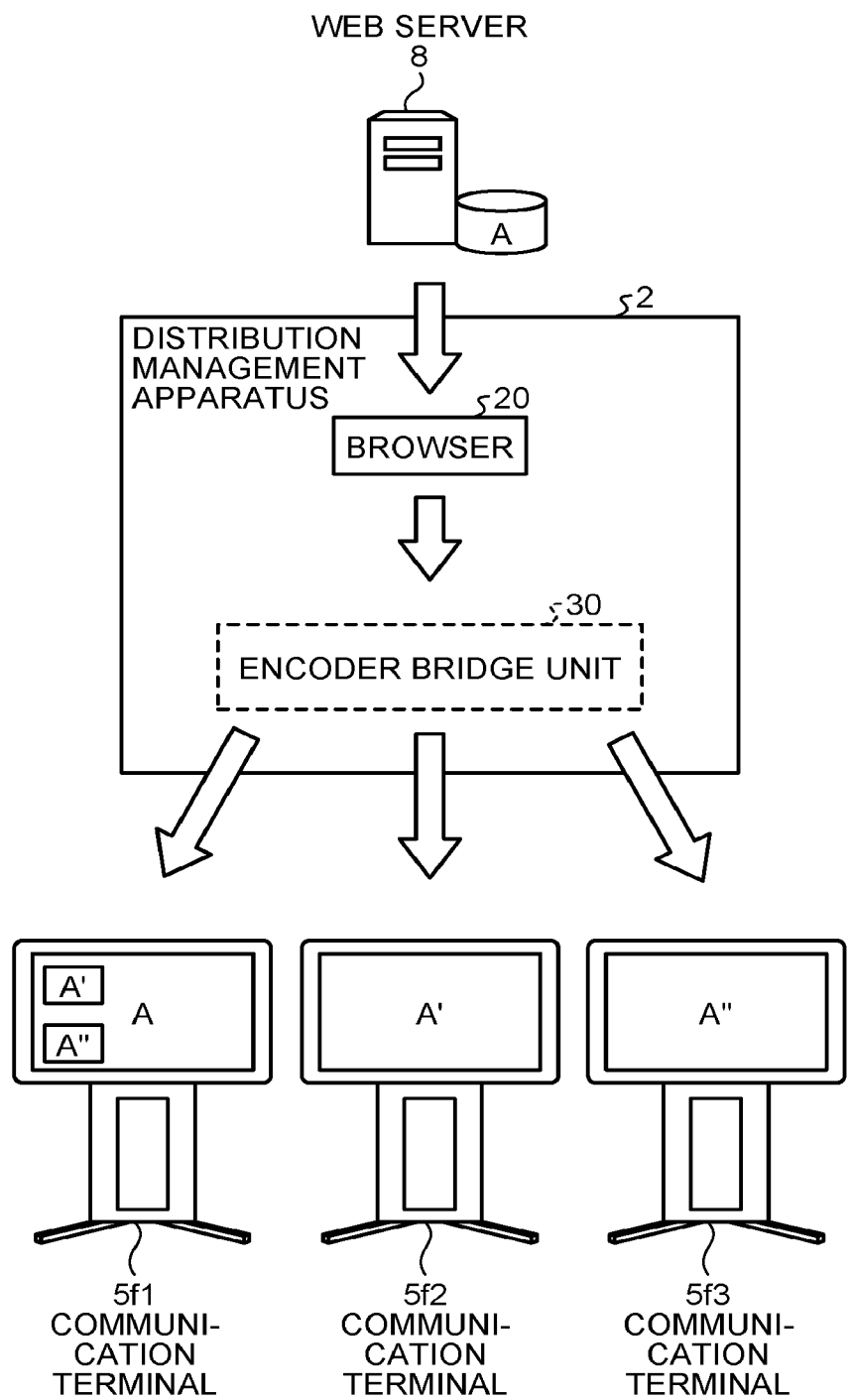
FIG. 5 is a conceptual diagram of zoom-in display exploiting the multi-display.

Furthermore, the distribution system 1 can, by applying the above-described distribution method, distribute web content to the plurality of communication terminals 5 as video (audio) data as illustrated in FIG. 4 and FIG. 5. The distribution methods illustrated in FIG. 4 and FIG. 5 are described below.

Multi-Display

FIG. 4 is a conceptual diagram of multi-display. As illustrated in FIG. 4, the single browser 20 of the distribution management apparatus 2 generates a single piece of video (audio) data [XYZ] by acquiring web content data [XYZ] from the web server 8 and rendering it. The encoder bridge unit 30 divides the single piece of video (audio) data [XYZ] into a plurality of pieces of video (audio) data [X], [Y], and [Z] and, thereafter, encodes them. Thereafter, the distribution management apparatus 2 distributes the dividing-resultant video (audio) data [X] to a communication terminal 5/1. Similarly, the distribution management apparatus 2 distributes the dividing-resultant video (audio) data [Y] to a communication terminal 5/2 and distributes the dividing-resultant video (audio) data [Z] to a communication terminal 5/3. Thus, because even if the web content data [XYZ] is of a landscape format, video is displayed by the plurality of communication terminals 5/1, 5/2, and 5/3 as being divided, an effect similar to that obtained by displaying a single video of a large size can be obtained by arranging the communication terminals 5/1, 5/2, and 5/3 in a row. At this time, the communication terminals 5/1, 5/2, and 5/3 are necessarily identical in display/playback capabilities (e.g., identical in resolution). Such a distribution method as that described above is referred to as, for example, "multi-display".

Zoom-In Display Exploiting Multi-Display

With the multi-display, a single piece of video data generated by the browser 20 of the distribution management apparatus 2 can be distributed to the plurality of communication terminals 5 as different pieces of video data. By utilizing this, for example, it is possible to cause one of the plurality of communication terminals 5 to display a whole video and another one of the communication terminals 5 to display a portion of the video in a zoomed-in manner. For example, in a situation where the video data is large in size and the video on one of the communication terminals 5 displaying the whole video is hard to view, ease of viewing can be increased by causing another one of the communication terminals 5 to display a desired portion, which is zoomed in depending on display/playback capabilities (e.g., resolution) of the communication terminal 5, of the video.

FIG. 5 is a conceptual diagram of zoom-in display exploiting the multi-display. As illustrated in FIG. 5, the single browser 20 of the distribution management apparatus 2 generates the single piece of video data [A] by acquiring the web content data [A] from the web server 8 and rendering it. The encoder bridge unit 30 encodes the video data [A]. The distribution management apparatus 2 distributes the encoded video data [A] to the plurality of communication terminals 5/1, 5/2, and 5/3.

Thereafter, when an operation of zooming into a portion of the video [A] being displayed is performed by a user on the communication terminal 5/1 and operation data [p] (first operation data) regarding the operation is transmitted from the communication terminal 5/1 to the distribution management apparatus 2, the encoder bridge unit 30 performs a process of cutting out a partial region of the video data [A] generated by the browser 20. The size of the region to be cut out depends on the display/playback capabilities (e.g., resolution) of the communication terminal 5/2, 5/3. For example, in a case where the video data [A] is large in size and the video data [A] is resized (zoomed out) to display the whole video, a region of a size displayable on the communication terminal 5/2, 5/3 without resizing may be cut out. The encoder bridge unit 30 encodes each of the video data [A] generated by the browser 20, video data [A'] representing a partial region cut out from the video data [A] depending on the display/playback capabilities (e.g., resolution) of the communication terminal 5/2, and video data [A"] representing a partial region cut out from the video data [A] depending on the display/playback capabilities (e.g., resolution) of the communication terminal 5/3. The distribution management apparatus 2 distributes the encoded video data [A] to the communication terminal 5/1, the encoded video data [A'] to the communication terminal 5/2, and the encoded video data [A"] to the communication terminal 5/3. Thus, causing the communication terminal 5/1 to display the whole video while causing the communication terminals 5/1 and 5/2 to display the portion, which is zoomed in, of the video displayed on the communication terminal 5/1 can be achieved.

An initial position of the region to be cut out from the video is determined in advance. Both the distribution management apparatus 2 and the communication terminal 5/1 externally acquire the initial position and store it. Furthermore, the communication terminal 5/1 externally acquires the display/playback capabilities (e.g., resolution) of the communication terminals 5/2 and 5/3 and stores them. When an operation of zooming into a portion of the video data [A] being displayed is performed by a user, the communication terminal 5/1 displays a guide frame of a size that depends on the display/playback capabilities of the communication terminal 5/2 by superimposing the guide frame on the video data [A] at the initial position for the communication terminal 5/2. Similarly, the communication terminal 5/1 displays a guide frame of a size that depends on the display/playback capabilities of the communication terminal 5/3 by superimposing the guide frame on the video data [A] at the initial position for the communication terminal 5/3. At an early stage of the zoom-in display, videos of regions, which are surrounded by the guide frames and zoomed in, are displayed on the communication terminals 5/2 and 5/3, respectively.

Thereafter, when an operation of moving the guide frame in the video [A] being displayed is performed by the user on the communication terminal 5/1 and operation data [p] (second operation data) indicating a distance and direction traveled by the guide frame is transmitted from the communication terminal 5/1 to the distribution management apparatus 2, the encoder bridge unit 30 moves the position where the region is to be cut out from the video data [A] in accordance with the operation data [p]. For example, when the guide frame moved by the user is the guide frame associated with the communication terminal 5/2, the encoder bridge unit 30 changes the position where the video data [A']

to be distributed to the communication terminal 5/2 is to be cut out in accordance with the operation data [p] indicating the distance and direction traveled by the guide frame. The encoder bridge unit 30 encodes the video data [A'] of the newly-cut-out region. Thereafter, the distribution management apparatus 2 distributes the video data [A'] of the newly-cut-out region to the communication terminal 5/2. As a result, a video of the region surrounded by the guide frame moved by the user is displayed in a zoomed-in manner on the communication terminal 5/2. Thus, by moving the guide frame to the region, which is desired to be zoomed in, on the video data [A] displayed on the communication terminal 5/1, the user can cause the zoomed-in video of the region surrounded by the guide frame to be displayed on the other communication terminal 5/2, 5/3.

At this time, the communication terminals 5/1, 5/2, and 5/3 are not necessarily identical in the display/playback capabilities (e.g., identical in resolution).

Detailed Description of Embodiment

The embodiment is described in detail below with reference to FIG. 6 to FIG. 23.

<Hardware Components of Embodiment>

Figure 6:
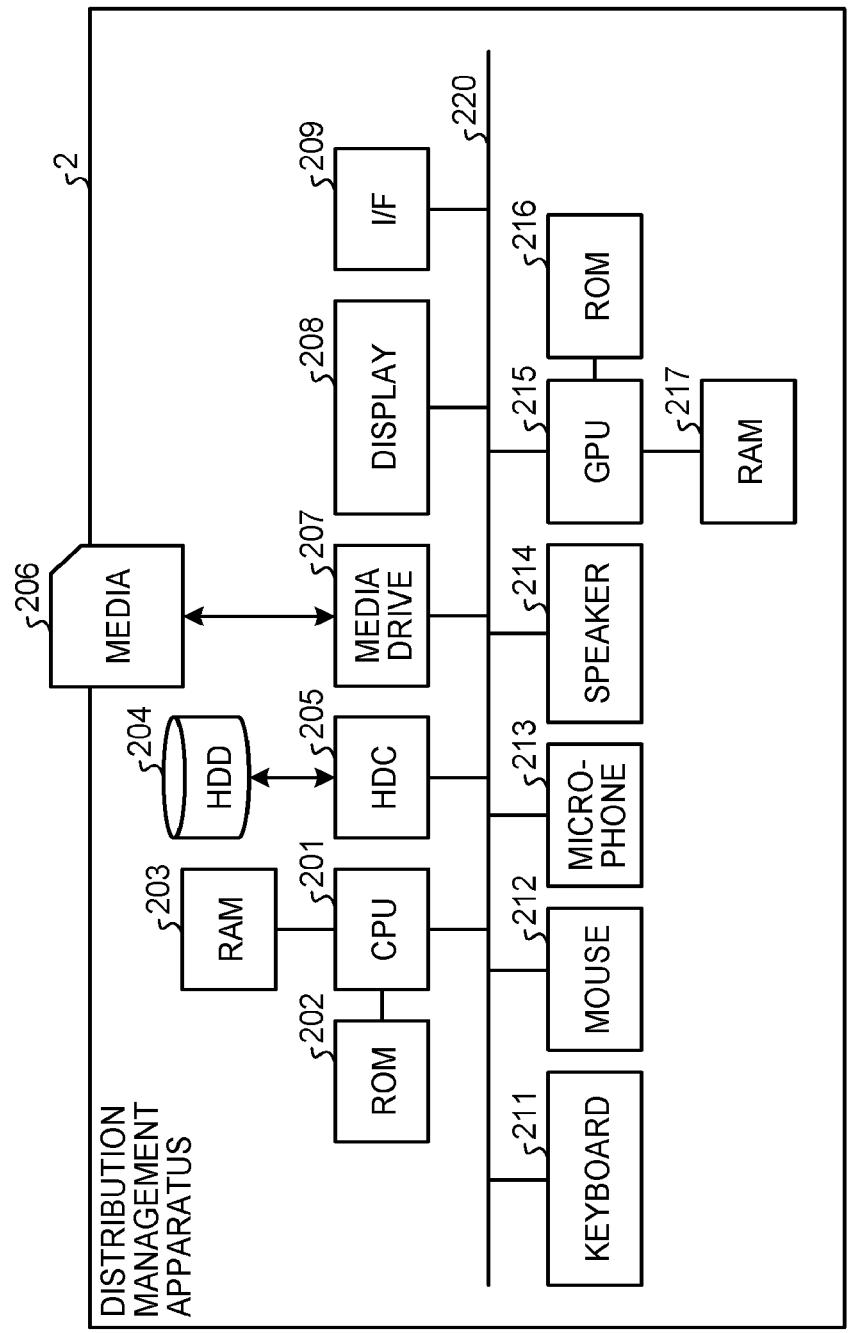
FIG. 6 is a diagram illustrating an example of hardware components of a distribution management apparatus.
Figure 7:
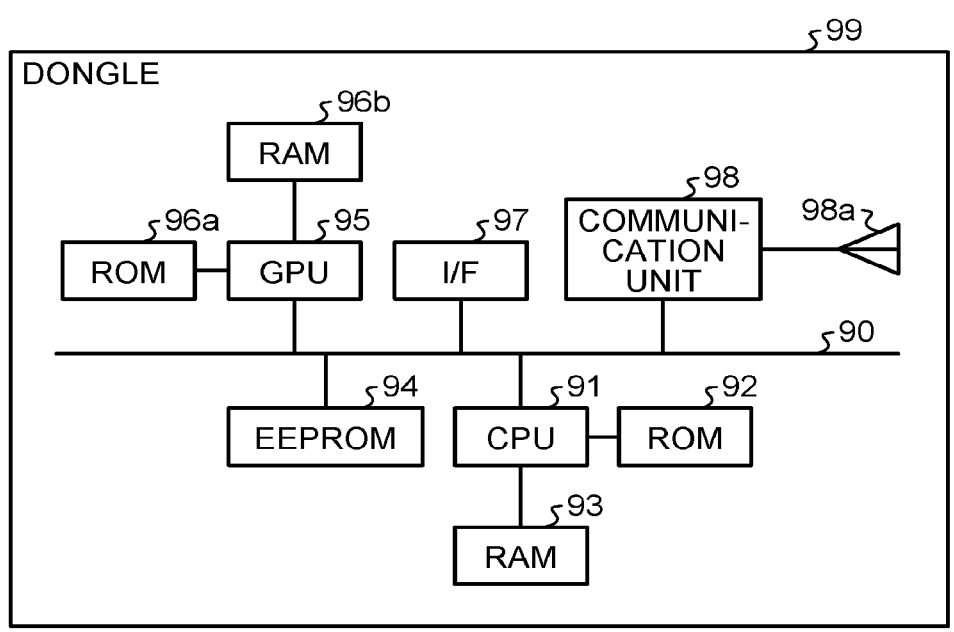
FIG. 7 is a diagram illustrating an example of hardware components of the dongle.

Hardware components of the present embodiment are described below with reference to FIG. 6 and FIG. 7. FIG. 6 is a diagram of logical hardware components of the distribution management apparatus 2. FIG. 7 is a diagram of logical hardware components of the dongle 99. Because the communication terminal 5, the terminal management apparatus 7, and the web server 8 are identical in hardware components to the distribution management apparatus 2 illustrated in FIG. 6, description thereof is omitted.

As illustrated in FIG. 6, the distribution management apparatus 2 includes a (host) CPU 201 for controlling operations of the whole distribution management apparatus 2, a ROM 202 storing therein a program, such as an IPL, for use in driving the CPU 201, a RAM 203 for use as a work area of the CPU 201, an HDD 204 storing therein various data including programs, an HDC (Hard Disk Controller) 205 for controlling reading and writing various data from and to the HDD 204 under control of the CPU 201, a media drive 207 for controlling reading and writing data from and to a recording media 206, such as a flash memory, a display 208 for displaying various information, an I/F 209 for transmitting data using the communication network 9 and for connection with the dongle 99, a keyboard 211, a mouse 212, a microphone 213, a speaker 214, a GPU (Graphics Processing Unit) 215, a ROM 216 storing therein a program for use in driving the GPU 215, a RAM 217 for use as a work area of the GPU 215, and an expansion bus line 220 including an address bus and a data bus for electrically connecting the above-described elements.

Programs for the communication terminals, systems, and servers may be configured to be distributed as being recorded in computer-readable recording media, e.g., the recording media 206, as installable- or executable-format files.

Next, the hardware components of the dongle 99 are described with reference to FIG. 7. As illustrated in FIG. 7, the dongle 99 includes a CPU 91 for controlling operations of the whole dongle 99, a ROM 92 storing therein a basic input/output program, a RAM 93 for use as a work area of the CPU 91, an EEPROM (Electrically Erasable and Programmable ROM) 94, from and to which data is to be read and written under control of the CPU 91, a GPU 95 for performing various image processing, a ROM 96a storing therein a program for use in driving the GPU 95, a RAM 96b for use as a work area of the GPU 95, an I/F 97 for connecting to the I/F 209 of the communication terminal 5, an antenna 98a, a communication unit 98 for carrying out communications using a short-distance wireless technology using the antenna 98a, and a bus line 90 including an address bus and a data bus for electrically connecting the above-described elements. Examples of the short-distance wireless technology include the NFC (Near Field Communication) standards, Bluetooth (registered trademark), WiFi (Wireless Fidelity), and ZigBee (registered trademark).

<Functional Components of Embodiment>

Functional components of the present embodiment are described next with reference to FIG. 8 to FIG. 15.

Functional Components of Distribution Management Apparatus

Figure 8:
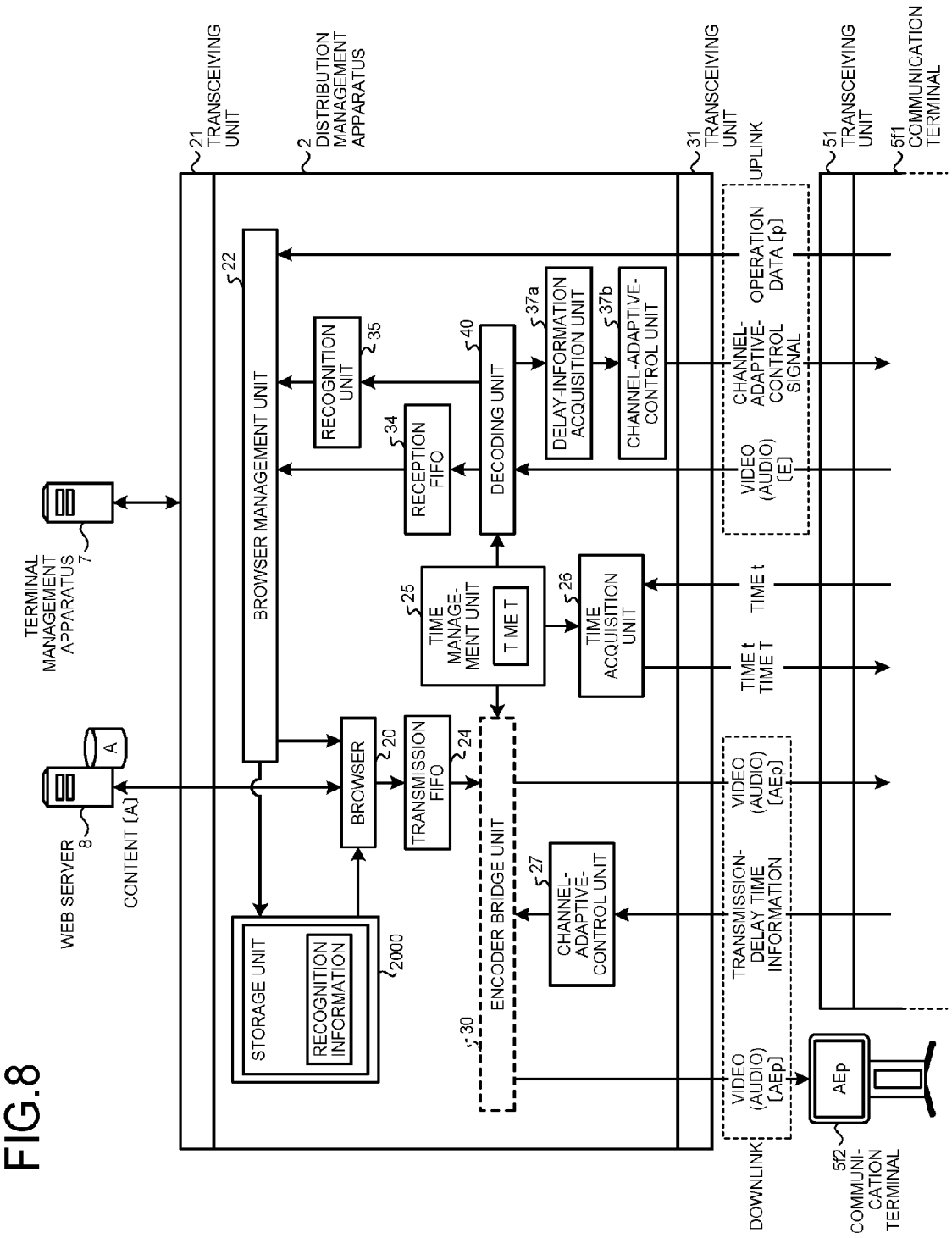
FIG. 8 is a functional block diagram primarily illustrating functions of the distribution management apparatus.

FIG. 8 is a functional block diagram primarily illustrating functions of the distribution management apparatus 2. Although FIG. 8 illustrates the functional components of the distribution management apparatus 2 distributing video (audio) data to the communication terminal 5/1, the distribution management apparatus 2 distributing data to other destination than the communication terminal 5/1 has similar functional components. Although the distribution management apparatus 2 includes a plurality of distribution engine servers, for brevity of description, the following description is made by way of example, in which the distribution management apparatus 2 includes a single distribution engine server.

The distribution management apparatus 2 implements the functional components illustrated in FIG. 8 with the hardware components illustrated in FIG. 6 and a program. Specifically, the distribution management apparatus 2 includes the browser 20, a transceiving unit 21, a browser management unit 22, a transmission FIFO 24, a time management unit 25, a time acquisition unit 26, a channel-adaptive-control unit 27, the encoder bridge unit 30, a transceiving unit 31, an index generation unit 32, a reception FIFO 34, a recognition unit 35, a delay-information acquisition unit 37a, a channel-adaptive-control unit 37b, and a decoding unit 40. The distribution management apparatus 2 further includes a storage unit 2000 implemented by the HDD 204 illustrated in FIG. 6. The storage unit 2000 stores therein recognition information, which is described later, output from the recognition unit 35. Content data acquired by the browser 20 can be temporarily stored in the storage unit 2000 as a cache.

The browser 20, which is one of the functional components, is a web browser that operates in the distribution management apparatus 2. The browser 20 generates RGB data (or PCM (Pulse Code Modulation) data) by rendering content data, such as web content data. Furthermore, the browser 20 is capable of generating video (audio) data by playing back a video (audio) file using a plug-in, which is described later. The present embodiment is described on an assumption that data generated by the browser 20 is video (audio) data. The browser 20 is constantly updated to adapt to web contents getting richer.

In the distribution system 1 of the present embodiment, the distribution management apparatus 2 includes a plurality of the browsers 20, from which a cloud browser for use in establishing a user session is to be selected. For brevity of description, an example, in which the single browser 20 is provided, is described below.

The browser 20 may include, for example, Media Player, Flash Player, JavaScript (registered trademark), CSS (Cascading Style Sheet), and an HTML (HyperText Markup Language) renderer. JavaScript (registered trademark) includes JavaScript according to a standard specification and JavaScript specific to the distribution system 1. Media Player is a browser plug-in for playing back multimedia files, e.g., a video (audio) file, in the browser 20. Flash Player is a browser plug-in for playing back Flash content within the browser 20. The specific JavaScript (registered trademark) is a JavaScript (registered trademark) group providing APIs (Application Programming Interfaces) for services unique to the distribution system 1. CSS is a mechanism for efficiently defining appearances and styles of web pages described in HTML. The HTML renderer is a web-kit-based HTML rendering engine.

The transceiving unit 21 transmits and receives various data, requests, and the like to and from the terminal management apparatus 7 and the web server 8. For example, the transceiving unit 21 receives web content data from a content site of the web server 8 and passes it to the browser 20.

The browser management unit 22 manages the browser 20 and the encoder bridge unit 30. For example, the browser management unit 22 instructs the browser 20 and the encoder bridge unit 3 to start or stop running and assigns an encoder ID at start or stop. The encoder ID is identification information assigned by the browser management unit 22 for process management of the encoder bridge unit 30. Furthermore, the browser management unit 22 assigns a browser ID each time the browser 20 is started and manages it. The browser ID is identification information for identification of the browser 20 assigned by the browser management unit 22 for process management of the browser 20.

Furthermore, the browser management unit 22 acquires various operation data [p] from the communication terminal 5 via the transceiving unit 31 and outputs it to the browser 20. The operation data [p] is data generated responsive to an operation event (e.g., an operation performed using the keyboard 211, the mouse 212, or the like and a stroke made with an electronic pen P) on the communication terminal 5. When the communication terminal 5 includes various sensors, e.g., a temperature sensor, a humidity sensor, and an acceleration sensor, the browser management unit 22 acquires sensor information, which is output signals of the sensors, from the communication terminal 5 and outputs it to the browser 20.

The transmission FIFO 24 is a buffer for storing therein video (audio) data [AEp] generated by the browser 20.

The time management unit 25 manages time T, which is local to the distribution management apparatus 2. The time acquisition unit 26 performs a time adjustment process in conjunction with a time control unit 56, which is described later, of the communication terminal 5. Specifically, the time acquisition unit 26 acquires time information (T) indicating the time T in the distribution management apparatus 2 from the time management unit 25, receives time information (t) indicating time t in the communication terminal 5 from the time control unit 56, which is described later, via the transceiving unit 31 and a transceiving unit 51, and transmits the time information (t) and the time information (T) to the time control unit 56.

The channel-adaptive-control unit 27 calculates, on the basis of transmission-delay-time information (D), playback delay time U, which is described later, and operating conditions including a frame rate and data resolution of a converting unit 10, which is described later, of the encoder bridge unit 30. The playback delay time U is time, for which playing back data is delayed by buffering the data until played back. Specifically, the channel-adaptive-control unit 27 changes operations of the encoder bridge unit 30 on the basis of the transmission-delay-time information (D) and a data size (e.g., the number of bits or the number of bytes). As will be described later, the transmission-delay-time information (D) indicates frequency distribution information formed from a plurality of pieces of transmission delay time D1 acquired from a playback control unit 53 by a delay-information acquisition unit 57 of the communication terminal 5. Each piece of the transmission delay time D1 is time from when video (audio) data is transmitted from the distribution management apparatus 2 to when the same is received by the communication terminal 5.

The encoder bridge unit 30 outputs frame data, each piece of which is generated by the browser 20 as still-picture (audio) data, to the converting unit 10, which is described later, of the encoder bridge unit 30. At this time, the converting unit 10 performs processes with the operating conditions calculated by the channel-adaptive-control unit 27 into consideration.

Figure 9:
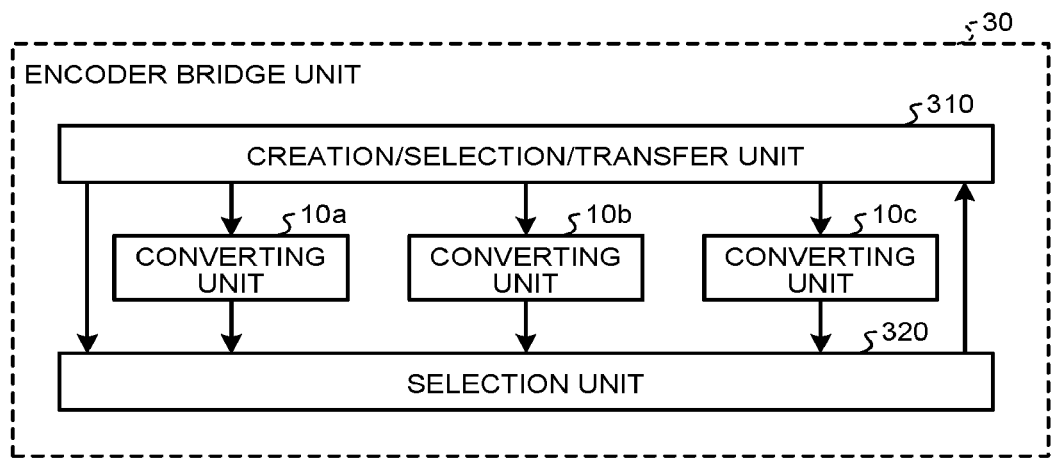
FIG. 9 is a detailed diagram of an encoder bridge unit.
Figure 10:
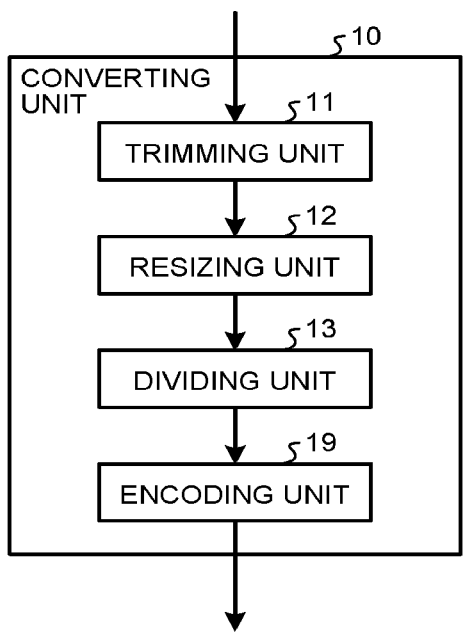
FIG. 10 is a functional block diagram illustrating functions of a converting unit.

The encoder bridge unit 30 is described in more detail with reference to FIG. 9 and FIG. 10. FIG. 9 is a detailed diagram of the encoder bridge unit 30. FIG. 10 is a functional block diagram illustrating the functions of the converting unit 10.

As illustrated in FIG. 9, the encoder bridge unit 30 includes a creation/selection/transfer unit 310, a selection unit 320, and a plurality of converting units 1a, 10b, and 10c constructed therebetween. Although the three converting units 10a, 10h, and 10c are illustrated herein, the number of the converting units may be any number. Hereinafter, an arbitrary one of the converting units is denoted as the converting unit 10".

The converting unit 10 converts a data format of video (audio) data generated by the browser 20 into a data format that allows distribution to the communication terminal 5 via the communication network 9. For this purpose, as illustrated in FIG. 10, the converting unit 10 includes a trimming unit 11, a resizing unit 12, a dividing unit 13, and the encoding unit 19. The trimming unit 11, the resizing unit 12, and the dividing unit 13 perform no process on audio data.

The trimming unit 11 performs a process of cutting out only a portion of a video. For example, when performing the above-described zoom-in display exploiting the multi-display, the trimming unit 11 cuts out a region to be displayed in a zoomed-in manner from video data generated by the browser 20. When a whole video is to be displayed on one of the plurality of communication terminals 5, while a partial region is to be displayed in a zoomed-in manner on another one(s) of the communication terminals 5, the converting units 10 of the same number as the communication terminals 5 are provided in accordance with the above-described first operation data. In the converting unit 10, which is one of the converting units 10, assigned to the communication terminal 5 that displays the whole video, the process of the trimming unit 11 is not performed. By contrast, in the converting unit(s) 10 assigned to the communication terminal(s) 5 that displays the zoomed-in partial region, the trimming unit 11 cuts out a region at an initial position defined by selected coordinate information, which is described later, of a size defined by resolution information, which is described later, from the video data generated by the browser 20 in accordance with the above-described first operation data.

Further description by way of concrete example is given below. In the example illustrated in FIG. 5, in addition to the converting unit 10 being used, the converting unit 10 assigned to the communication terminal 5/2 and the converting unit 10 assigned to the communication terminal 5/3 are newly created in accordance with the first operation data fed from the communication terminal 5/1. The converting unit 10 being used is assigned to the communication terminal 5/1. The trimming unit 11 of the converting unit 10 assigned to the communication terminal 5/2 defines a size and an initial position of a region to be cut out on the basis of resolution information and selected coordinate information for the communication terminal 5/2 acquired from the terminal management apparatus 7 and cuts out the region from the video data generated by the browser 20. Similarly, the trimming unit 11 of the converting unit 10 assigned to the communication terminal 5/3 defines a size and an initial position of a region to be cut out on the basis of resolution information and selected coordinate information for the communication terminal 5/3 acquired from the terminal management apparatus 7 and cuts out the region from the video data generated by the browser 20.

When second operation data is transmitted from the communication terminal 5/1, the trimming unit 11 of the converting unit 10 assigned to the communication terminal 5/2 changes the position of the region to be cut out, while maintaining its size, in accordance with the above-described distance and direction traveled by the guide frame indicated by the second operation data. Similarly, the trimming unit 11 of the converting unit 10 assigned to the communication terminal 5/2 changes the position of the region to be cut out, while maintaining its size, in accordance with the above-described distance and direction traveled by the guide frame indicated by the second operation data. The above-described zoom-in display exploiting the multi-display is achieved by this process, performed by the trimming unit 11, of cutting out a video.

The resizing unit 12 changes a zoom ratio of a video (image). For example, in the example illustrated in FIG. 5, if the size of the video data generated by the browser 20 exceeds the display/playback capabilities (e.g., resolution) of the communication terminal 5/1, the resizing unit 12 of the converting unit 10 assigned to the communication terminal 5/2 zooms out the video data generated by the browser 20 in accordance with the resolution of the communication terminal 5/1 to display the whole video on the communication terminal 5/1. At this time, the size of the region to be cut out from the video data generated by the browser 20 by the trimming unit 11 of the converting unit 10 assigned to the communication terminal 5/2 or the converting unit 10 assigned to the communication terminal 5/3 can be set to a size that allows displaying the video that is not zoomed out by the resizing unit 12 on the communication terminal 5/2 or the communication terminal 5/3, for example. At this time, the size of the region to be cut out from the video data generated by the browser 20 may preferably be a size that allows displaying, on the communication terminal 5/2 or the communication terminal 5/3, the video data representing the region with the need of neither zooming out nor in by the resizing unit 12 (without processing by the resizing unit 12). Alternatively, the size of the region to be cut out from the video data generated by the browser 20 may be a size that allows displaying the video data representing the region zoomed in at a predetermined ratio by the resizing unit 12 on the communication terminal 5/2 or the communication terminal 5/3.

The dividing unit 13 divides the web content acquired from the web server 8 as illustrated in FIG. 4.

The encoding unit 19 encodes image (audio) data generated by the browser 20, thereby performing conversion into image (audio) data distributable to the communication terminal 5 via the communication network 9. When the video is still (when no frame-to-frame alteration (change) occurs), the encoding unit 19 inserts skip frame (which may be referred to as "frame skip") data to immediately before a motion occurs in the video, thereby saving band. When audio data is generated concurrently with still-picture data by rendering, the both data is encoded. When only audio data is generated, none of trimming, resizing, and dividing is performed but only encoding is performed to perform data compression.

The creation/selection/transfer unit 310 performs newly creating the converting unit 10, selecting video (audio) data to be fed to the converting unit 10, which is already created, and the like. Examples of a situation, in which the creation/selection/transfer unit 310 newly creates the converting unit 10, include a situation, in which the creation/selection/transfer unit 310 creates the converting unit 10 capable of conversion depending on video (audio) data playback capabilities of the communication terminal 5 as in a case of performing the above-described zoom-in display exploiting the multi-display. Examples of a situation, in which the creation/selection/transfer unit 310 selects video (audio) data to be fed to the converting unit 10, include a situation, in which the creation/selection/transfer unit 310 selects the converting unit 10 that is already created. For example, when starting distribution to the communication terminal 5b in addition distribution to the communication terminal 5a, a scenario that the same video (audio) data as the video (audio) data being distributed to the communication terminal 5a is distributed to the communication terminal 5b can occur. The examples include a case where, in this scenario, the communication terminal 5b has the same video (audio) data playback capability as the playback capability of the communication terminal 5a. Specifically, in such a case, the creation/selection/transfer unit 310 uses the converting unit 10a, which is already created for the communication terminal 5a, rather than newly creating the converting unit 10b for the communication terminal 5b.

The selecting unit 320 selects a desired one from the converting units 10 that are already created. The selections made by the creation/selection/transfer unit 310 and the selection unit 320 enable performing distribution in various patterns.

Referring back to FIG. 8, the transceiving unit 31 transmits and receives various data, requests, and the like to and from the communication terminals 5. For example, in a login process of the communication terminal 5, the transceiving unit 31 transmits, to the transceiving unit 51, which is described later, of the communication terminal 5, authentication screen data for prompting a user to submit a login request. Furthermore, the transceiving unit 31 performs data transmission and data reception to and from application programs (user application and device application) installed on the communication terminal 5 via an HTTPS (Hypertext Transfer Protocol over Secure Socket Layer) server to receive a service(s) provided by the distribution system 1 using a protocol specific to the distribution system 1. The protocol specific to the distribution system 1 is an HTTPS-based application layer protocol for uninterruptedly transmitting and receiving data in real time between the distribution management apparatus 2 and the communication terminal 5. The transceiving unit 31 also performs processes including response transmission control, real-time data generation, client command transmission, response reception control, received data analysis, and gesture conversion.

The response transmission control is a process of managing an HTTPS session for downloading requested (requested) from the communication terminal 5 to transmit data from the distribution management apparatus 2 to the communication terminal 5. Response of the HTTPS session for downloading does not end immediately but persists for a certain period of time (for one to several minutes). The transceiving unit 31 dynamically writes data to be transmitted to the communication terminal 5 to a body portion of the response. Furthermore, to save cost for reconnection, another request is desirably received from the communication terminal 5 before the preceding session ends. Even if connection is re-established, overhead can be cut by placing the transceiving unit 31 on standby until the preceding request is completed.

The real-time data generation is a process of adding a unique header to the compressed video (and compressed audio) data generated by the encoding unit 19 illustrated in FIG. 10 and writing it to a body portion of HTTPS downlink to the communication terminal 5.

The client command transmission is a process of generating command data to be transmitted to the communication terminal 5 and writing it to a body portion of HTTPS for distribution (downlink) to the communication terminal 5.

The response reception control is a process of managing an HTTPS session for transmission (uplink) requested from the communication terminal 5 so that the distribution management apparatus 2 can receive data from the communication terminal 5. Response of this HTTPS session does not end immediately but persists for a certain period of time (for one to several minutes). The communication terminal 5 dynamically writes data to be transmitted to the transceiving unit 31 of the distribution management apparatus 2 to a body portion of the request.

The received data analysis is a process of analyzing data transmitted from the communication terminal 5 on a per-type basis and passing the data to a necessary process.

The gesture conversion is a process of converting a gesture event entered by a user to the communication terminal 5f configured as the digital whiteboard with the electronic pen P or by handwriting into a form acceptable by the browser 20.

Referring back to FIG. 8, the reception FIFO 34 is a buffer for storing therein video (audio) data decoded by the decoding unit 40.

The recognition unit 35 performs processing on video (audio) data [E] received from the communication terminal 5. Specifically, for example, the recognition unit 35 recognizes the face, age, sex, and the like of a person or an animal in a video captured by a camera 62, which is described later, for signage purpose. Furthermore, the recognition unit 35 performs name tagging using face recognition, replacing a background video, and the like on a video captured by the camera 62, which is described later, for office purpose. The recognition unit 35 stores recognition information indicating recognized matters in the storage unit 2000. The recognition unit 35 achieves speedup by performing processing using a recognition expansion board.

The delay-information acquisition unit 37a is used in an uplink channel-adaptive-control process in connection with the delay-information acquisition unit 57 on the communication terminal 5 used in a downlink channel-adaptive-control process. Specifically, the delay-information acquisition unit 37a acquires transmission-delay-time information (d1) indicating transmission delay time d1 from the decoding unit 40, holds it for a certain period of time, and when a plurality of pieces of the transmission-delay-time information (d1) has been acquired, outputs transmission-delay-time information (d) indicating frequency distribution information formed from the plurality of pieces of transmission delay time d1 to the channel-adaptive-control unit 37b. The transmission-delay-time information (d1) indicates time from when video (audio) data is transmitted from the communication terminal 5 to when the video (audio) data is received by the distribution management apparatus 2.

The channel-adaptive-control unit 37b is used in the uplink channel-adaptive-control process in connection with the channel-adaptive-control unit 27 used in the downlink channel-adaptive-control process. Specifically, the channel-adaptive-control unit 37b calculates operating conditions of an encoding unit 60 on the communication terminal 5 on the basis of the transmission-delay-time information (d). Furthermore, the channel-adaptive-control unit 37b transmits a channel-adaptive-control signal indicating the operating conditions including a frame rate and data resolution to the encoding unit 60 of the communication terminal 5 via the transceiving unit 31 and the transceiving unit 51, which is described later.

The decoding unit 40 decodes the video (audio) data [E] transmitted from the communication terminal 5. Furthermore, the decoding unit 40 outputs the transmission-delay-time information (d1) indicating the transmission delay time d1 to the delay-information acquisition unit 37a.

Functional Components of Communication Terminal

Figure 11:
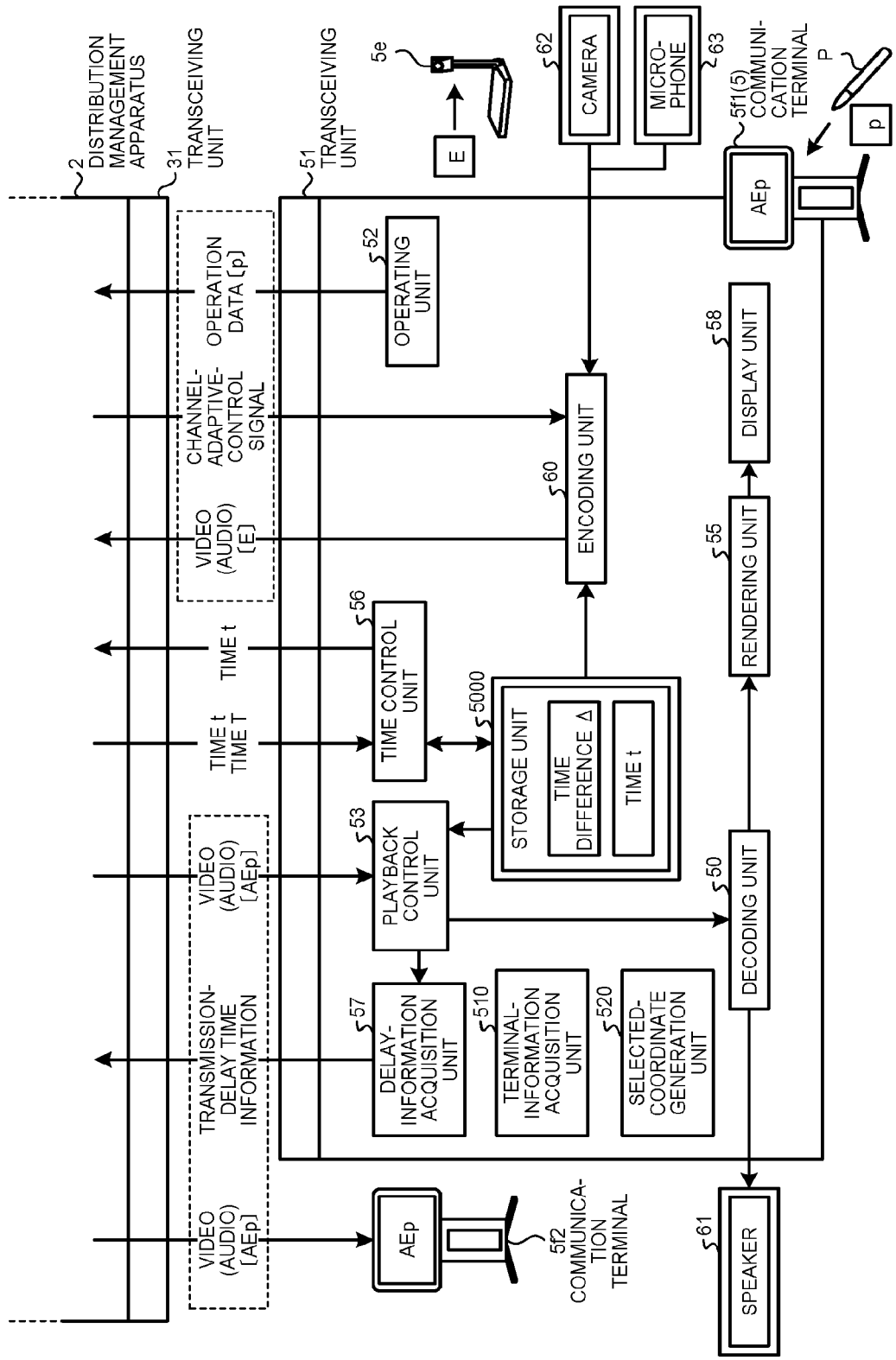
FIG. 11 is a functional block diagram primarily illustrating functions of the communication terminal.

Functional components of the communication terminal 5 are described below with reference to FIG. 11. FIG. 11 is a functional block diagram primarily illustrating functions of the communication terminal 5. Although FIG. 11 illustrates the communication terminal 5f1 as one of the communication terminal 5, the communication terminals 5 other than the communication terminal 5f1 have similar functional components. Among the communication terminals 5, the communication terminal 5, on which the user application is installed, serves as an interface, across which a user performs login to the distribution system 1, starting and stopping distribution of video (audio) data, and the like. By contrast, the communication terminal 5, on which the device application is installed, does not has the above-described interface and performs only transmission and reception of video (audio) data and transmission of the operation data [p]. For convenience, the description below is made on an assumption that the user application is installed on the communication terminal 5.

The communication terminal 5 implements the functional components illustrated in FIG. 11 with hardware components similar to those illustrated in FIG. 6 and a program (the user application). Specifically, the communication terminal 5 includes a decoding unit 50, the transceiving unit 51, an operating unit 52, the playback control unit 53, a rendering unit 55, the time control unit 56, the delay-information acquisition unit 57, a display unit 58, the encoding unit 60, a terminal-information acquisition unit 510, and a selected-coordinate generation unit 520. The communication terminal 5 further includes a storage unit 5000 implemented by the RAM 203 illustrated in FIG. 6. The storage unit 5000 stores therein time difference information ($\Delta$) indicating time difference $\Delta$, which is described later, the time information (t) indicating the time t in the communication terminal 5, terminal information acquired by the terminal-information acquisition unit 510, which is described later, from the terminal management apparatus 7, and the like.

The decoding unit 50 decodes the video (audio) data [AEp] distributed from the distribution management apparatus 2 and output from the playback control unit 53.

The transceiving unit 51 transmits and receives various data, requests, and the like to and from the transceiving unit 31 of the distribution management apparatus 2 and to and from a transceiving unit 71a, which is described later, of the terminal management apparatus 7. For example, in the login process of the communication terminal 5, the transceiving unit 51 submits a login request to the transceiving unit 71 of the terminal management apparatus 7 in response to startup, initiated by the operating unit 52, of the communication terminal 5.

The operating unit 52 performs a process of accepting an operation entered by a user. For example, the operating unit 52 accepts an input, selection, and the like made using a power-supply switch, a keyboard, a mouse, the electronic pen P, or the like, and transmits it as the operation data [p] to the browser management unit 22 of the distribution management apparatus 2.

The playback control unit 53 buffers video (audio) data (real-time data packets) received from the transceiving unit 51 and outputs it to the decoding unit 50 with the playback delay time U taken into account. Furthermore, the playback control unit 53 calculates transmission-delay-time information (D1) indicating the transmission delay time D1 and outputs it to the delay-information acquisition unit 57.

The rendering unit 55 renders the data decoded by the decoding unit 50.

The time control unit 56 performs the time adjustment process in conjunction with the time acquisition unit 26 of the distribution management apparatus 2. Specifically, the time control unit 56 acquires the time information (t) indicating the time t in the communication terminal 5 from the storage unit 5000. Furthermore, the time control unit 56 submits a request for the time information (T) indicating the time T in the distribution management apparatus 2 to the time acquisition unit 26 of the distribution management apparatus 2 via the transceiving unit 51 and the transceiving unit 31. At this time, the time information (t) is transmitted together with the request for the time information (T).

The delay-information acquisition unit 57 acquires the transmission-delay-time information (D1) indicating the transmission delay time D1 from the playback control unit 53, holds it for a certain period of time, and when a plurality of pieces of the transmission-delay-time information (D1) has been acquired, outputs the transmission-delay-time information (D) indicating frequency distribution information formed from the plurality of pieces of transmission delay time D1 to the channel-adaptive-control unit 27 via the transceiving unit 51 and the transceiving unit 31. The transmission-delay-time information (D) may be transmitted once for every 100 frames, for example.

The display unit 58 displays a video by playing back the data rendered by the rendering unit 55. When an operation of zooming into a portion of the video being displayed is performed by a user using the operating unit 52, the display unit 58 determines the size of the above-described guide frame on the basis of resolution information regarding the other communication terminal(s) 5 contained in the terminal information acquired by the terminal-information acquisition unit 510, which is described later, from the terminal management apparatus 7 and stored in the storage unit 5000. Furthermore, the display unit 58 determines the position where the above-described guide frame is to be displayed on the video being displayed on the basis of selected coordinate information (initial position) regarding the other communication terminal(s) 5 contained in the terminal information acquired by the terminal-information acquisition unit 510, which is described later, from the terminal management apparatus 7 and stored in the storage unit 5000. The display unit 58 displays the guide frame of the determined size by superimposing the guide frame at the determined position on the video being displayed. When an operation of moving the guide frame displayed superimposed on the video is performed by the user performs using the operating unit 52, the display unit 58 causes the guide frame displayed superimposed on the image to move in accordance with the operation.

The encoding unit 60 transmits the video (audio) data [E], which is obtained by encoding data acquired from the built-in microphone 213 (see FIG. 6), or the external camera 62 and an external microphone 63, time information ($t_0$) indicating time $t_0$ at the current point in time in the communication terminal 5 acquired from the storage unit 5000, and the time difference information ($\Delta$), which is also acquired from the storage unit 5000, indicating the time difference $\Delta$ to the decoding unit 40 of the distribution management apparatus 2 via the transceiving unit 51 and the transceiving unit 31. The time difference is the difference between the time T managed locally in the distribution management apparatus 2 and the time t managed locally in the communication terminal 5. The encoding unit 60 changes the operating conditions of the encoding unit 60 on the basis of the operating conditions indicated by the channel-adaptive-control signal received from the channel-adaptive-control unit 37b. Furthermore, the encoding unit 60 transmits, in accordance with the changed new operating conditions, the video (audio) data [E], which is obtained by encoding the data acquired from the camera 62 and the microphone 63, the time information ($t_0$) indicating the time $t_0$ at the current point in time in the communication terminal 5 acquired from the storage unit 5000, and the time difference information ($\Delta$) indicating the time difference $\Delta$ acquired from the storage unit 5000, to the decoding unit 40 of the distribution management apparatus 2 via the transceiving unit 51 and the transceiving unit 31.

The built-in microphone 213, and the external camera 62 and the external microphone 63 are an example of input means and are various devices requiring encoding and decoding. The input means may be configured to be capable of outputting tactile (touch) data and olfactory (smell) data in addition to the video (audio) data. FIG. 11 illustrates an example, in which the communication terminal 5e configured as the television conference terminal is connected to the communication terminal 5f1 configured as the digital whiteboard, and the camera and the microphone of the communication terminal 5e are used as the external camera 62 and the external microphone 63 of the communication terminal 5f1.

The terminal-information acquisition unit 510 acquires, from the terminal management apparatus 7, terminal information regarding the other communication terminals 5 managed by the terminal management apparatus 7 and stores it in the storage unit 5000. The terminal information contains resolution information indicating resolution of the communication terminal 5 and selected coordinate information indicating the initial position where the guide frame is to be displayed as being superimposed. The method to be used by the terminal-information acquisition unit 510 in acquiring the terminal information from the terminal management apparatus 7 is not specifically limited but can be any method, with which the terminal information can be acquired without external leakage.

The selected-coordinate generation unit 520 generates coordinate information indicating a position where the display unit 58 is to display and superimpose the guide frame on the video being displayed in accordance with the operation of moving the guide frame performed by the user using the operating unit 52. The display unit 58 displays and superimposes the guide frame on the video in accordance with the coordinate information generated by the selected-coordinate generation unit 520, thereby moving the position of the guide frame in accordance with the user's operation.

Functional Components of Terminal Management Apparatus

Figure 12:
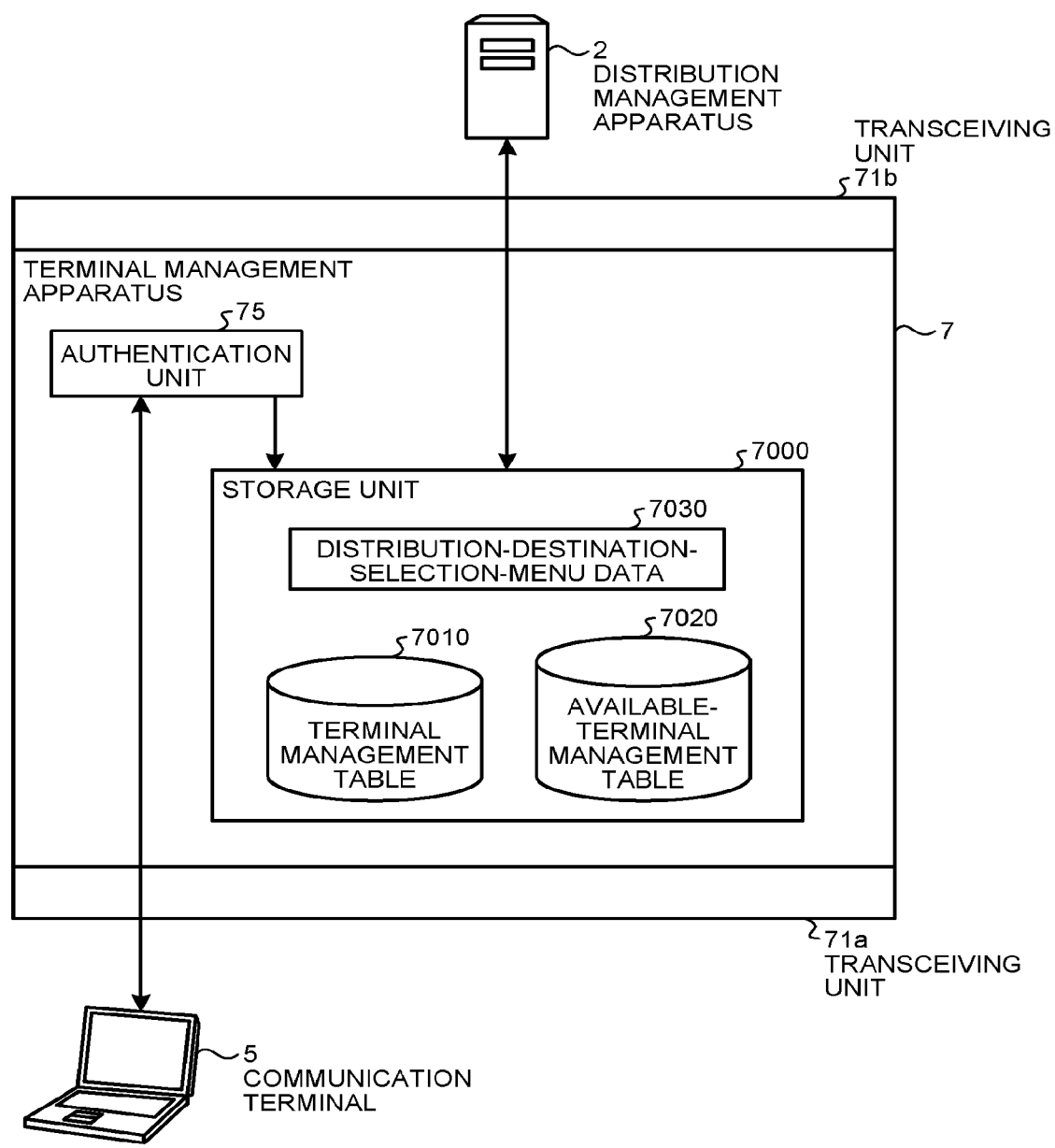
FIG. 12 is a functional block diagram illustrating functions of a terminal management apparatus.

Functional components of the terminal management apparatus 7 are described below with reference to FIG. 12. FIG. 12 is a functional block diagram illustrating functions of the terminal management apparatus 7.

The terminal management apparatus 7 implements the functional components illustrated in FIG. 12 with hardware components similar to those illustrated in FIG. 6 and a program. Specifically, the terminal management apparatus 7 includes the transceiving unit 71a, a transceiving unit 71b, and an authentication unit 75. The terminal management apparatus 7 further includes a storage unit 7000 implemented by the HDD 204 illustrated in FIG. 6.

The transceiving unit 71a transmits and receives various data, requests, and the like to and from the communication terminal 5. For example, the transceiving unit 71a receives a login request from the transceiving unit 51 of the communication terminal 5 and transmits a result of authentication on the login request to the transceiving unit 51. The login request is a request requesting the distribution system 1 to authenticate the communication terminal 5. The login request contains a terminal ID for unique identification of the communication terminal 5 and a user certificate.

The transceiving unit 71b transmits and receives various data, requests, and the like to and from the distribution management apparatus 2. For example, the transceiving unit 71b receives a request for distribution-destination-selection-menu data 7030, which is described later, from the transceiving unit 21 of the distribution management apparatus 2 and transmits the distribution-destination-selection-menu data 7030 to the transceiving unit 21.

The authentication unit 75 searches through a terminal management table 7010 by the terminal ID and the user certificate contained in the login request received from the communication terminal 5 to determine whether or not the same combination of the terminal ID and the user certificate is contained, thereby authenticating the communication terminal 5.

The storage unit 7000 stores therein the distribution-destination-selection-menu data 7030, the terminal management table 7010, and an available-terminal management table 7020.

The distribution-destination-selection-menu data 7030 is data for displaying the distribution-destination selection menu screen illustrated in FIG. 13. FIG. 13 is a conceptual diagram of the distribution-destination selection menu screen. A list of sharing IDs and display names, which are described later, regarding the communication terminals 5 that are selectable as distribution destination is displayed on the distribution-destination selection menu screen illustrated in FIG. 13. A user can distribute video (audio) data to a desired one of the communication terminals 5 by marking a checkbox of the communication terminal 5, to which the user desires to distribute the video (audio) data, on the distribution-destination selection menu screen and pressing "OK" button.

FIG. 14 is a conceptual diagram of the terminal management table 7010. As illustrated in FIG. 14, in the terminal management table 7010, terminal IDs of the registered communication terminals 5, user certificates, contract information about users' usage of a service(s) provided by the distribution system 1, terminal types of the communication terminals 5, setting information indicating home URLs (Uniform Resource Locators) of the communication terminals 5, execution environment information regarding the respective communication terminals 5, sharing IDs, layout position information, and display name information that are mutually associated are managed.

The user certificate is a certificate certificating that the communication terminal 5 is permitted to connect to the distribution system 1. The user certificate is given in advance to the communication terminals 5 permitted to connect to the distribution system 1. The contract information indicates details of contract for usage of the service(s), which is provided by the distribution system 1, by a user using the communication terminal 5 identified by the terminal ID. The terminal type indicates a type of the communication terminal 5. The setting information indicates a home URL of the communication terminal 5 identified by the corresponding terminal ID.

The execution environment information includes "Favorite", "Previous Cookie Information", and "Cache File" of each of the communication terminals 5. The execution environment information is transmitted to the distribution management apparatus 2 together with the setting information after login of each of the communication terminals 5 and used to provide the service(s) individually to the communication terminals 5.

The sharing ID is an ID for use in remote sharing and the like performed, by each user, by causing the same video (audio) data as the video (audio) data being distributed to the own communication terminal 5 to the other communication terminal(s) 5 and is identification information for identification of the other communication terminal or a group of the other communication terminals. In the example illustrated in FIG. 14, the sharing ID assigned to the terminal ID "t006" is "v006", the sharing ID assigned to the terminal ID "t007" is "v006", and the sharing ID assigned to the terminal ID "t008" is "v006". When a request for remote sharing with the communication terminals 5/1, 5/2, and 5/3 assigned with the sharing ID "v006" is submitted from the communication terminal 5a assigned with the terminal ID "t001", the distribution management apparatus 2 distributes, to the communication terminals 5/1, 5/2, and 5/3, the same video (audio) data as the video (audio) data being distributed to the communication terminal 5a. Note that, when the communication terminal Sa differs from the communication terminals 5/1, 5/2, and 5/3 in resolution of the display unit 58, the distribution management apparatus 2 distributes the video (audio) data accordingly.

The layout position information indicates, as illustrated in FIG. 4 and FIG. 5, layout positions in a situation where the plurality of communication terminals 5/1, 5/2, and 5/3 are arranged in a row, for example. The display name information is information indicating the display names on the distribution-destination selection menu screen illustrated in FIG. 13.

Figure 16:
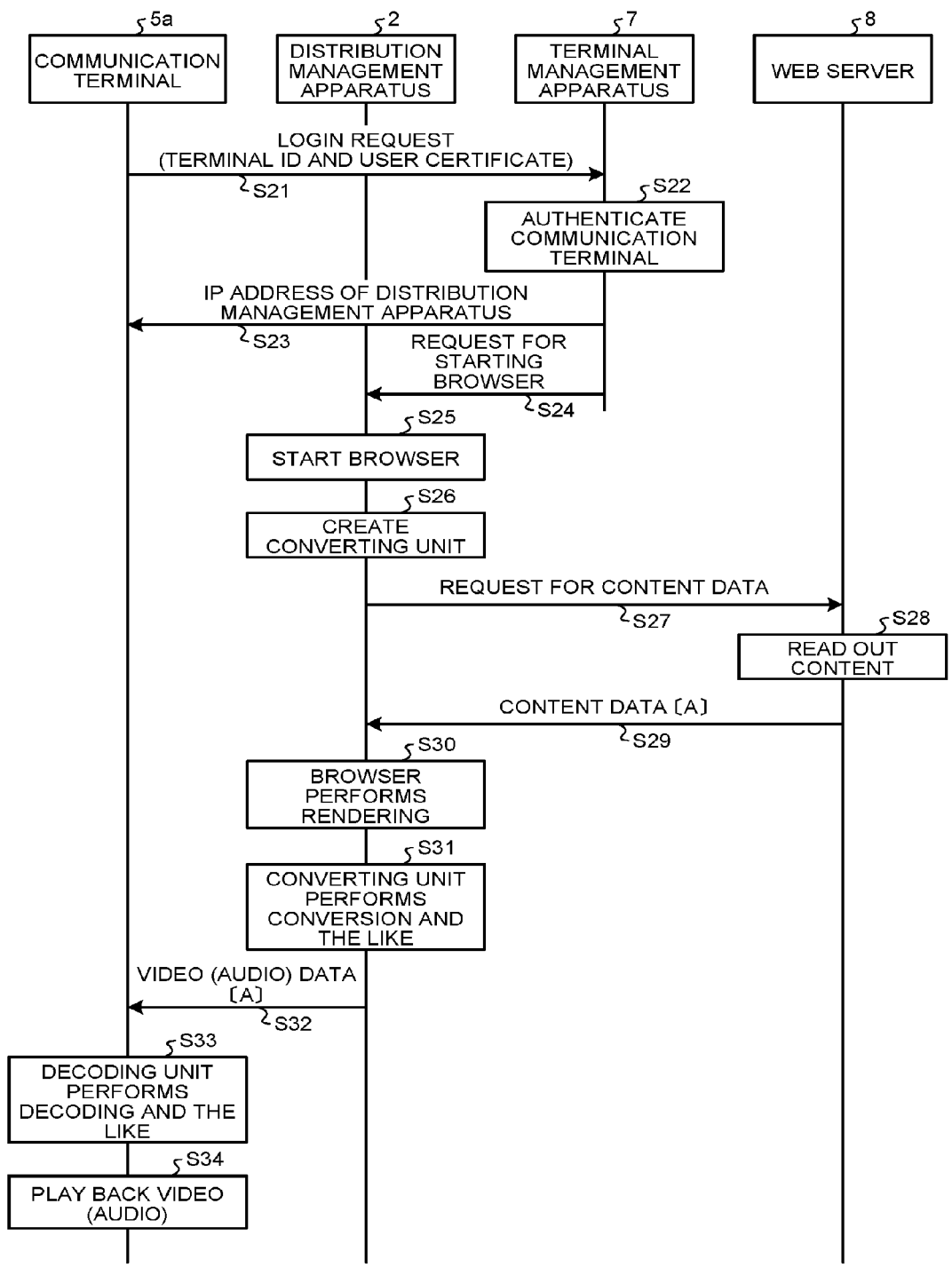
FIG. 16 is a sequence diagram illustrating a basic distribution process of the distribution management apparatus.

The resolution information is information indicating resolution of each of the communication terminals 5. Resolution is a measure indicating fineness of videos (images) handled by the display unit 58 included in the communication terminal 5 and is one of the display/playback capabilities of the communication terminal 5. The resolution information indicates resolution of the communication terminal 5 by (the number of pixels in a row)×(the number of pixels in a column) as illustrated in FIG. 16, for example.

The selected coordinate information is information indicating an initial position where a guide frame associated with each of the communication terminals 5 is to be displayed superimposed on another one of the communication terminals 5. For example, assume that, in the example illustrated in FIG. 14, the communication terminal 5 assigned with the terminal ID "t006" is the communication terminal 5/1 illustrated in FIG. 5; the communication terminal 5 assigned with the terminal ID "t007" is the communication terminal 5/2 illustrated in FIG. 5; the communication terminal 5 assigned with the terminal ID "t008" is the communication terminal 5/3 illustrated in FIG. 5. At this time, the selected coordinate information "(600100)" associated with the terminal ID "t007" indicates a start address of the guide frame, which is associated with the communication terminal 5/2, to be displayed superimposed on a video being displayed on the communication terminal 5/1. The selected coordinate information "(6002400)" associated with the terminal ID "t008" indicates a start address of the guide frame, which is associated with the communication terminal 5/3, to be displayed superimposed on the video being displayed on the communication terminal 5/1. The start address indicates an initial position of the guide frame and may be, for example, top-left coordinates of the guide frame.

When performing a zoom-in process exploiting the above-described multi-display, the communication terminal 5 that accepts user's zoom-in operation acquires terminal information containing resolution information and selected coordinate information from the terminal management apparatus 7. For example, the above-described terminal-information acquisition unit 501 of the communication terminal 5 that accepts user's operation submits, to the terminal management apparatus 7, a request for terminal information regarding the other communication terminal(s) 5 having the same sharing ID as the own communication terminal 5. Responsive to the request from the communication terminal 5, the terminal management apparatus 7 reads out resolution information and selected coordinate information regarding the communication terminal(s) 5 having the same sharing ID as the requesting communication terminal 5 from the terminal management table 7010 and transmits terminal information containing the resolution information and the selected coordinate information to the requesting communication terminal 5 as a response to the request.

FIG. 15 is a conceptual diagram of the available-terminal management table 7020. In the available-terminal management table 7020, the terminal IDs are managed such that each of the terminal IDs is associated with a sharing ID indicating another communication terminal or a group of other communication terminals, with which the communication terminal 5 indicated by the terminal ID can perform remote sharing.

Operations or Processes of Embodiment

Operations or processes of the present embodiment are described below with reference to FIG. 16 to FIG. 23.
<Basic Distribution Process>
A concrete distribution process using a basic distribution method of the distribution management apparatus 2 is described first with reference to FIG. 16. FIG. 16 is a sequence diagram illustrating a basic distribution process of the distribution management apparatus 2. Although a scenario, in which a login request is submitted using the communication terminal 5a, is described herein, a login may be performed using another one of the communication terminals 5 than the communication terminal 5a.

As illustrated in FIG. 16, when a user turns on the power to the communication terminal 5a, the transceiving unit 51 of the communication terminal 5a transmits a login request to the transceiving unit 71a of the terminal management apparatus 7 (Step S21). It follows that the transceiving unit 71a of the terminal management apparatus 7 receives the login request and outputs it to the authentication unit 75. This login request contains a terminal ID and a user certificate of the communication terminal 5a. Hence, the authentication unit 75 acquires the terminal ID and the user certificate of the communication terminal 5a.

Next, the authentication unit 75 searches through the terminal management table 7010 illustrated in FIG. 14 by the terminal ID and the user certificate to determine whether or not the same combination of the terminal ID and the user certificate is contained, thereby authenticating the communication terminal 5a (Step S22). The following description is made on an assumption that the terminal management table 7010 contains the same combination of the terminal ID and the user certificate or, in other words, the communication terminal 5a is authenticated as an authorized terminal in the distribution system 1.

The transceiving unit 71a of the terminal management apparatus 7 transmits the IP address of the distribution management apparatus 2 to the transceiving unit 51b of the communication terminal 5a (Step S23). The IP address of the distribution management apparatus 2 is acquired by the terminal management apparatus 7 from the distribution management apparatus 2 and stored in the storage unit 7000 in advance.

Next, the transceiving unit 71b of the terminal management apparatus 7 submits a request for starting the browser 20 to the transceiving unit 21 of the distribution management apparatus 2 (Step S24). It follows that the transceiving unit 21 receives the request for starting the browser 20. The browser management unit 22 starts the browser 20 in accordance with the startup request received by the transceiving unit 21 (Step S25).

Next, the creation/selection/transfer unit 310 of the encoder bridge unit 30 creates the converting unit 10 in accordance with playback capability (e.g., resolution of a display) of the communication terminal 5a and a content type (Step S26).

Next, the transceiving unit 21 submits a request for the content data [A] to the web server 8 as instructed by the browser 20 (Step S27). In response thereto, the web server 8 reads out the requested content data [A] from a storage unit (not shown) of its own (Step S28). The web server 8 transmits the content data [A] to the transceiving unit 21 of the distribution management apparatus 2 (Step S29).

Next, the browser 20 renders the content data [A] received by the transceiving unit 21, thereby generating frame data, each piece of which is still-picture (audio) data, and outputs it to the transmission FIFO 24 (Step S30). The converting unit 10 performs conversion into the video (audio) data [A] to be distributed to the communication terminal 5a by encoding the frame data stored in the transmission FIFO 24 (Step S31).

Next, the transceiving unit 31 transmits the video (audio) data [A] to the transceiving unit 51 of the communication terminal 5a (Step S32). It follows that the transceiving unit 51 of the communication terminal 5a receives the video (audio) data [A] and outputs it to the playback control unit 53.

Next, in the communication terminal 5a, the decoding unit 50 acquires the video (audio) data [A] from the playback control unit 53 and decodes it (Step S33). Thereafter, a speaker 61 plays back audio from the decoded audio data [A], while the display unit 58 plays back a video from the video data [A] acquired from the decoding unit 50 and rendered by the rendering unit 55 (Step S34).

<Time Adjustment Process>

Figure 17:
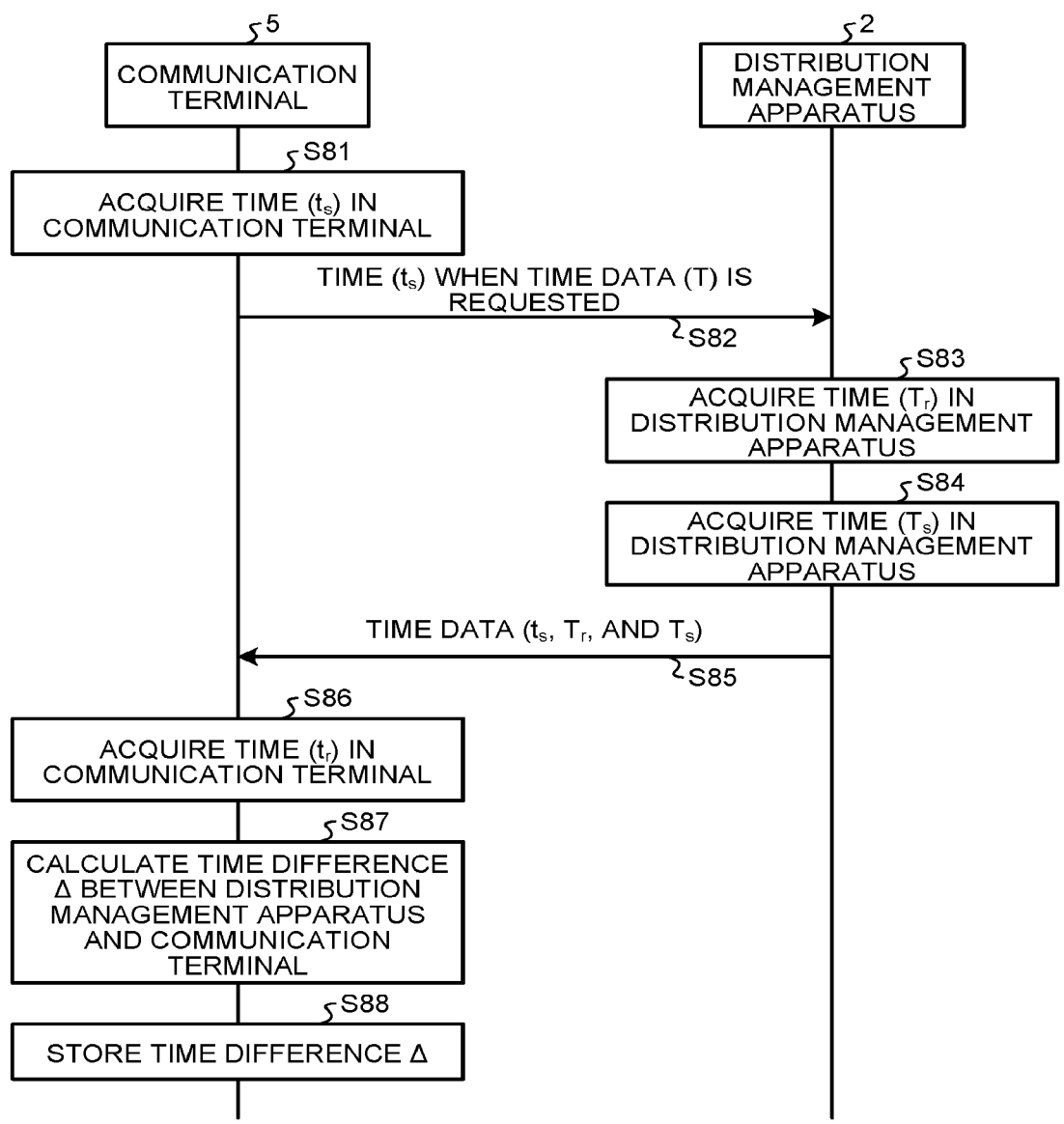
FIG. 17 is a sequence diagram illustrating a time adjustment process carried out between the distribution management apparatus and the communication terminal.

The time adjustment process is described below with reference to FIG. 17. FIG. 17 is a sequence diagram illustrating the time adjustment process carried out between the distribution management apparatus 2 and the communication terminal 5.

As illustrated in FIG. 17, first, the time control unit 56 of the communication terminal 5 acquires time information ($t_s$) in the communication terminal 5 from the storage unit 5000 to acquire time indicating a point in time when the transceiving unit 51 submits a request for the time information (T) to the distribution management apparatus 2 (Step S81). The transceiving unit 51 submits the request for the time information (T) in the distribution management apparatus 2 to the transceiving unit 31 (Step S82). At this time, the time information ($t_s$) is transmitted together with the request for the time information (T).

Next, the time acquisition unit 26 of the distribution management apparatus 2 acquires time information ($T_r$) in the distribution management apparatus 2 from the time management unit 25 to acquire time indicating a point in time when the transceiving unit 31 receives the request submitted at Step S82 described above (Step S83). Furthermore, the time acquisition unit 26 acquires time information ($T_s$) in the distribution management apparatus 2 from the time management unit 25 to acquire time indicating a point in time when the transceiving unit 31 responds to the request submitted at Step S82 described above (Step S84). The transceiving unit 31 transmits the time information ($t_s$, $T_r$, and $T_s$) to the transceiving unit 51 (Step S85).

Next, the time control unit 56 of the communication terminal 5 acquires time information ($t_r$) in the communication terminal 5 from the storage unit 5000 to acquire time indicating a point in time when the transceiving unit 51 receives the response made at Step S85 described above (Step S86). The time control unit 56 of the communication terminal 5 calculates the time difference $\Delta$ between the distribution management apparatus 2 and the communication terminal 5 (Step S87). The time difference $\Delta$ is expressed by the following Equation (1).

$$\Delta = ((T_r + T_s)/2) - ((t_r + t_s)/2) \quad (1)$$

The time control unit 56 stores the time difference information ($\Delta$) indicating the time difference in the storage unit 5000 (Step S88). This series of processing for time adjustment is performed regularly every minute, for example.

<Downlink Channel-Adaptive-Control Process>

Figure 18:
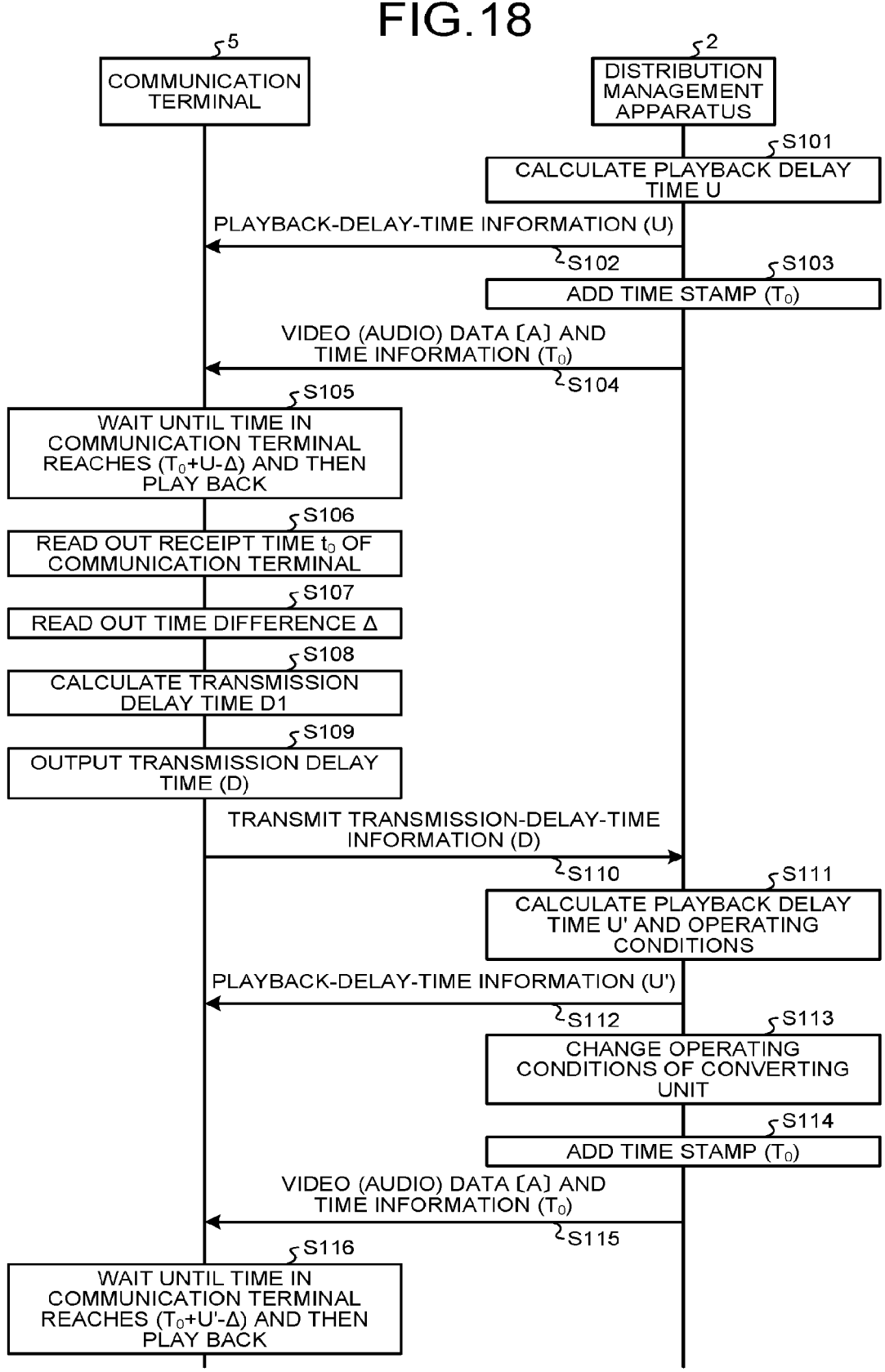
FIG. 18 is a sequence diagram illustrating a channel-adaptive-control process performed on data transmitted from the distribution management apparatus to the communication terminal.

A channel-adaptive-control process performed on (downlink) data transmitted from the distribution management apparatus 2 to the communication terminal 5 is described below with reference to FIG. 18. FIG. 18 is a sequence diagram illustrating the channel-adaptive-control process performed on data transmitted from the distribution management apparatus 2 to the communication terminal 5.

First, the channel-adaptive-control unit 27 of the distribution management apparatus 2 calculates playback-delay-time information (U) indicating the playback delay time U, for which the playback control unit 53 of the communication terminal 5 delays playing back video (audio) data by buffering it until played back, and outputs the playback-delay-time information (U) to the encoder bridge unit 30 (Step S101).

Next, the transceiving unit 31 acquires the playback-delay-time information (U) from the encoder bridge unit 30 and transmits the playback-delay-time information (U) to the transceiving unit 51 of the communication terminal 5 (Step S102). It follows that the transceiving unit 51 of the communication terminal 5 receives the playback-delay-time information (U). The encoder bridge unit 30 adds, to the video (audio) data [A] acquired from the transmission FIFO 24 and having undergone encoding and the like, time information ($T_0$) indicating time $T_0$ indicating a point in time when acquisition from the time management unit 25 is performed as a time stamp (Step S103). The transceiving unit 31 transmits the video (audio) data and the time information ($T_0$) regarding the distribution management apparatus 2 to the transceiving unit 51 of the communication terminal 5 (Step S104). It follows that the transceiving unit 51 of the communication terminal 5 receives the video (audio) data and the time information ($T_0$) regarding the distribution management apparatus 2 and outputs the video (audio) data and the time information ($T_0$) to the playback control unit 53.

Next, in the communication terminal 5, the playback control unit 53 waits until time in the communication terminal 5 reaches time ($T_0$+U−$\Delta$) using the playback-delay-time information (U) acquired at Step S102 described above, the time information ($T_0$) acquired at Step S104 described above, and the time difference information ($\Delta$) stored in the storage unit 5000 at Step S88 of FIG. 17 and then outputs the video (audio) data to the decoding unit 50, thereby causing the speaker 61 to play back audio and causing the display unit 58 to display a video through the rendering unit 55 (Step S105). It follows that whereas only video (audio) data received by the communication terminal 5 in duration of the playback delay time U expressed by the following Expression (2) is played back, and video (audio) data not received in the duration is deleted without being played back because delay is too large.

$$U \geq (t_0 + \Delta) - T_0 \quad (2)$$

Furthermore, the playback control unit 53 reads out the time $t_0$ in the communication terminal 5 at the current point in time from the storage unit 5000 (Step S106). The time $t_0$ indicates time in the communication terminal 5 at the point in time when the communication terminal 5 receives the video (audio) data from the distribution management apparatus 2. Furthermore, the playback control unit 53 reads out, from the storage unit 5000, the time difference information ($\Delta$) indicating the time difference $\Delta$ stored at Step S88 of FIG. 17 (Step S107). The playback control unit 53 calculates the transmission delay time D1 indicating time from when the video (audio) data is transmitted from the distribution management apparatus 2 to when the video (audio) data is received by the communication terminal 5 (Step S108). This calculation is performed using the following Equation (3). When the communication network 9 is congested, the transmission delay time D1 is long.

$$D1 = (t_0 + \Delta) - T_0 \quad (3)$$

Next, the delay-information acquisition unit 57 acquires the transmission-delay-time information (D1) indicating the transmission delay time D1 from the playback control unit 53, holds it for a certain period of time, and when a plurality of pieces of the transmission-delay-time information (D1) has been acquired, outputs the transmission-delay-time information (D) indicating frequency distribution information formed from the plurality of pieces of transmission delay time D1 to the transceiving unit 51 (Step S109). The transceiving unit 51 transmits the transmission-delay-time information (D) to the transceiving unit 31 of the distribution management apparatus 2 (Step S110). It follows that the transceiving unit 31 of the distribution management apparatus 2 receives the transmission-delay-time information (D) and outputs the transmission-delay-time information (D) to the channel-adaptive-control unit 27.

Next, on the basis of the transmission-delay-time information (D), the channel-adaptive-control unit 27 of the distribution management apparatus 2 newly calculates playback delay time U' and calculates the operating conditions including a frame rate and data resolution of the converting unit 10 and outputs them to the encoder bridge unit 30 (Step S111). In other words, the channel-adaptive-control unit 27 changes operations of the encoder bridge unit 30 on the basis of the transmission-delay-time information (D) and a data size (e.g., the number of bits or the number of bytes).

Next, the transceiving unit 31 acquires playback-delay-time information (U') indicating the new playback delay time U' calculated at Step S111 described above from the encoder bridge unit 30 and transmits the playback-delay-time information (U') to the transceiving unit 51 of the communication terminal 5 (Step S112). It follows that the transceiving unit 51 of the communication terminal 5 receives the playback-delay-time information (U').

Furthermore, the converting unit 10 of the encoder bridge unit 30 changes the operating conditions of the converting unit 10 on the basis of the channel-adaptive-control signal indicating the operating conditions (Step S113). For example, if, in a situation where the transmission delay time D1 is excessively long, the playback delay time U is prolonged in accordance with the transmission delay time D1, time when the speaker 61 and the display unit 58 play back is excessively delayed. Hence, there is a limit to prolonging the playback delay time U. Under the circumstances, the channel-adaptive-control unit 27 copes with congestion of the communication network 9 by not only causing the encoder bridge unit 30 to change the playback delay time U to the playback delay time U' but by also causing the converting unit 10 to decrease the frame rate of the video (audio) data or decrease the resolution of the video (audio) data. For this purpose, as at Step S103 described above, the encoder bridge unit 30 adds the time information ($T_0$) indicating the current point in time to the video (audio) data [A] as a time stamp in accordance with the changed operating conditions (Step S114). The transceiving unit 31 transmits the video (audio) data and the time information ($T_0$) regarding the distribution management apparatus 2 to the transceiving unit 51 of the communication terminal 5 (Step S115). It follows that the transceiving unit 51 of the communication terminal 5 receives the video (audio) data and the time information ($T_0$) regarding the distribution management apparatus 2 and outputs the video (audio) data and the time information ($T_0$) to the playback control unit 53.

Next, in the communication terminal 5, the playback control unit 53 waits until time in the communication terminal 5 reaches time ($T_0+U'-\Delta$) using the playback-delay-time information (U') acquired at Step S112 described above, the time information ($T_0$) acquired at Step S115 described above, and the time difference information ($\Delta$) stored in the storage unit 5000 at Step S88 of FIG. 17 and then outputs the video (audio) data to the decoding unit 50, thereby causing the speaker 61 to play back audio and causing the display unit 58 to display a video through the rendering unit 55 as at Step S105 described above (Step S116). This is followed by processing at Step S106 and subsequent steps. The downlink channel-adaptive-control process is continuously performed in this manner.

<Uplink Channel-Adaptive-Control Process>

Figure 19:
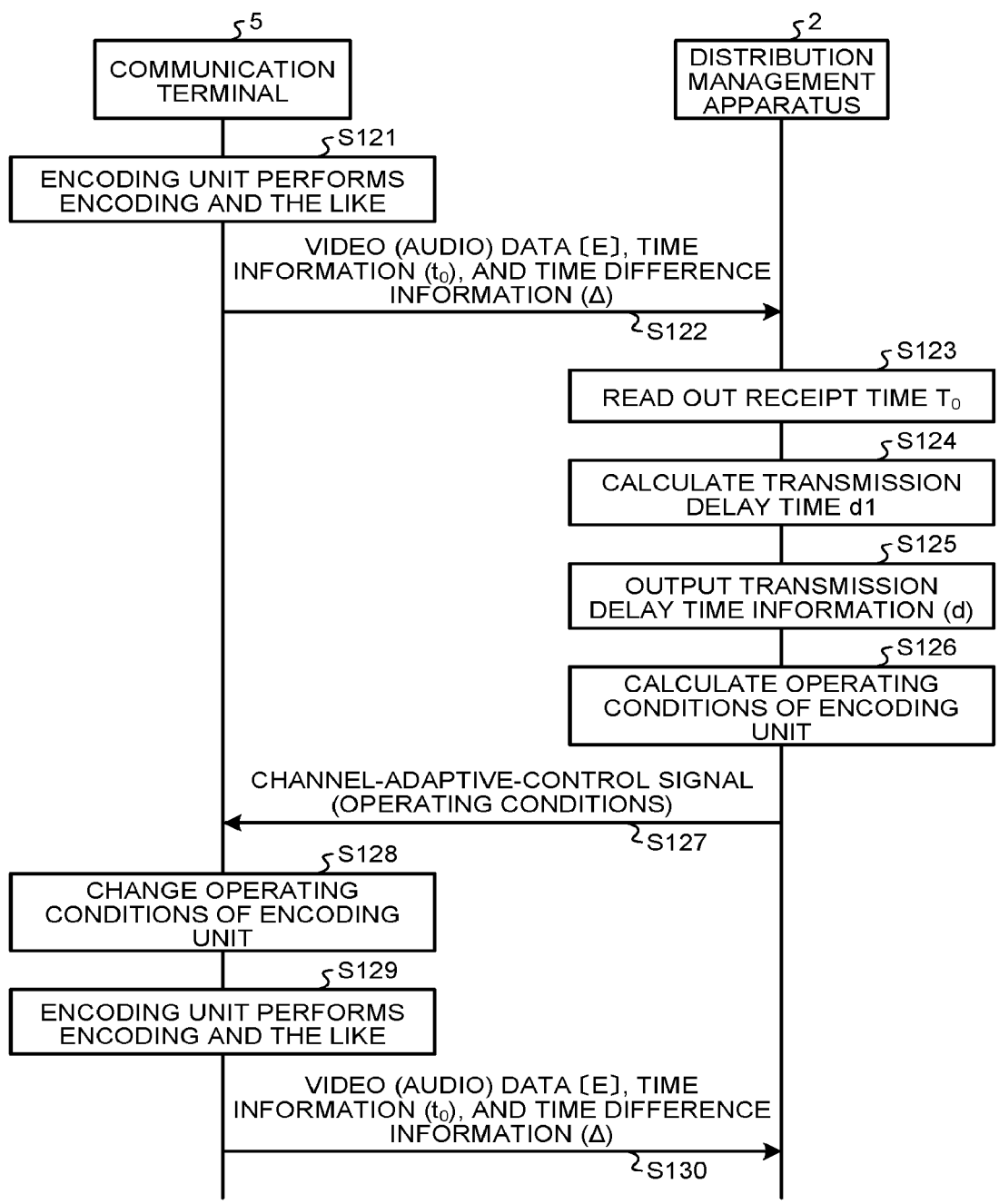
FIG. 19 is a sequence diagram illustrating a channel-adaptive-control process performed on data transmitted from the communication terminal to the distribution management apparatus.

A channel-adaptive-control process performed on (uplink) data transmitted from the communication terminal 5 to the distribution management apparatus 2 is described below with reference to FIG. 19. FIG. 19 is a sequence diagram illustrating the channel-adaptive-control process performed on data transmitted from the communication terminal 5 to the distribution management apparatus 2.

First, the encoding unit 60 of the communication terminal 5 encodes content data input as video (audio) data [E] from the camera 62 and the microphone 63 (Step S121). At this time, the encoding unit 60 acquires the time information ($t_0$) indicating the time $t_0$ at the current point in time in the communication terminal 5 and the time difference information ($\Delta$) indicating the time difference from the storage unit 5000, but the encoding unit 60 does not encode them. The transceiving unit 51 transmits the video (audio) data [E], the time information ($t_0$), and the time difference information ($\Delta$) to the transceiving unit 31 of the distribution management apparatus 2 (Step S122). It follows that the transceiving unit 31 of the distribution management apparatus 2 receives the video (audio) data [E], the time information ($t_0$), and the time difference information ($\Delta$).

Next, in the distribution management apparatus 2, the decoding unit 40 reads out, from the time management unit 25, the time $T_0$ indicating a point in time when the video (audio) data [E] and the like is received at Step S122 (Step S123). The decoding unit 40 calculates the transmission delay time d1 indicating time from when the video (audio) data is transmitted from the communication terminal 5 to when the video (audio) data is received by the distribution management apparatus 2 (Step S124). This calculation is performed using the following Equation (4). When the communication network 9 is congested, the transmission delay time d1 is long.

$$d1 = T_0 - (t_0 + \Delta) \qquad (4)$$

Next, as does the delay-information acquisition unit 57 of the communication terminal 5, the delay-information acquisition unit 37a of the distribution management apparatus 2 acquires the transmission-delay-time information (d1) indicating the transmission delay time d1 from the decoding unit 40, holds it for a certain period of time, and when a plurality of pieces of the transmission-delay-time information (d1) has been acquired, outputs transmission-delay-time information (d) indicating frequency distribution information formed from the plurality of pieces of transmission delay time d1 to the channel-adaptive-control unit 37b (Step S125).

Next, the channel-adaptive-control unit 37b calculates the operating conditions of the encoding unit 60 of the communication terminal 5 on the basis of the transmission-delay-time information (d) (Step S126). The transceiving unit 31 transmits a channel-adaptive-control signal indicating the operating conditions including a frame rate and data resolution to the transceiving unit 51 of the communication terminal 5 (Step S127). It follows that the transceiving unit 51 of the communication terminal 5 receives the channel-adaptive-control signal. Thus, while, in the channel adaptive control (downlink) illustrated in FIG. 18, the channel-adaptive-control signal is output to the encoder bridge unit 30 within the same distribution management apparatus 2, in the channel adaptive control (uplink) illustrated in FIG. 19, the channel-adaptive-control signal is transmitted from the distribution management apparatus 2 to the communication terminal 5 via the communication network 9.

Next, the encoding unit 60 of the communication terminal 5 changes the operating conditions of the encoding unit 60 on the basis of the operating conditions indicated by the channel-adaptive-control signal received by the transceiving unit 51 (Step S128). The encoding unit 60 performs processing similar to that performed as Step S121 in accordance with the new operating conditions (Step S129). The transceiving unit 51 transmits, as at Step S122 described above, the video (audio) data [E], which is obtained by encoding data acquired from the camera 62 and the microphone 63, the time information ($t_0$), which is acquired from the storage unit 5000, indicating the time $t_0$ at the current point in time in the communication terminal 5, and the time difference information ($\Delta$), which is also acquired from the storage unit 5000, indicating the time difference $\Delta$ to the transceiving unit 31 of the distribution management apparatus 2 (Step S130). It follows that the transceiving unit 31 of the distribution management apparatus 2 receives the video (audio) data [E], the time information ($t_0$), and the time difference information ($\Delta$). This is followed by processing at Step S123 and subsequent steps. The uplink channel-adaptive-control process is continuously performed in this manner.

<Multi-Display Process>

Figure 20:
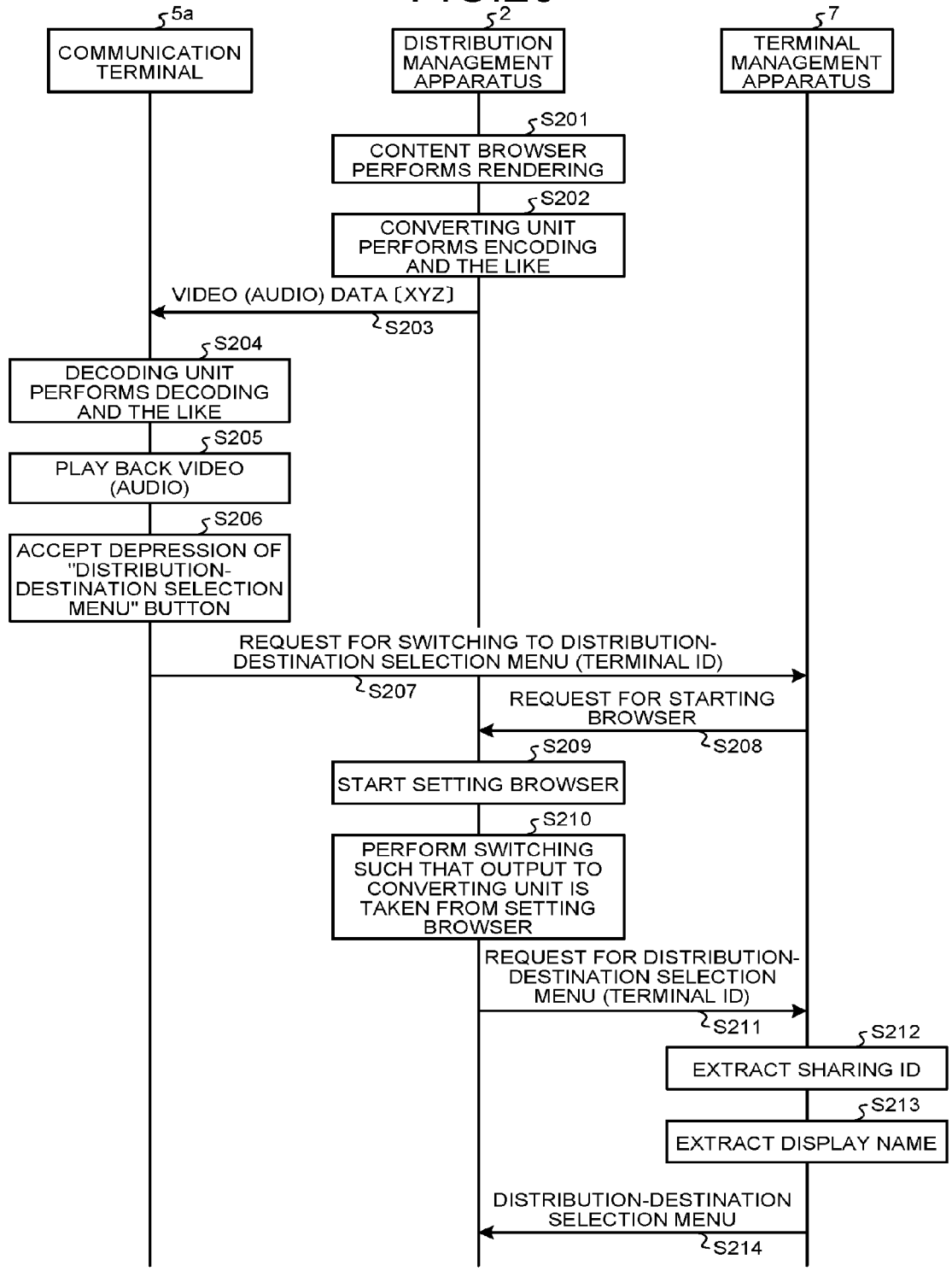
FIG. 20 is a sequence diagram illustrating a multi-display process.
Figure 21:
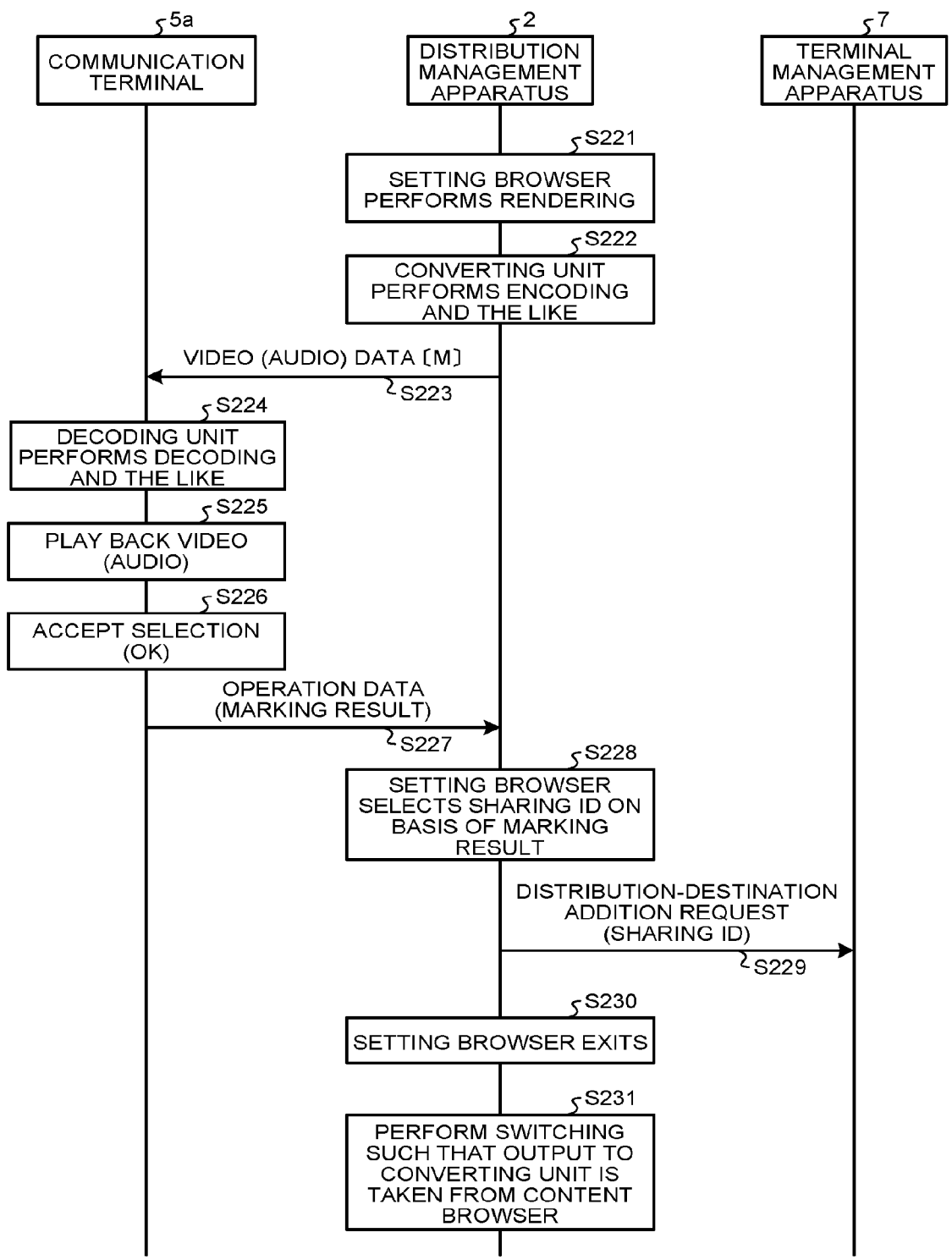
FIG. 21 is a sequence diagram illustrating the multi-display process.
Figure 22:
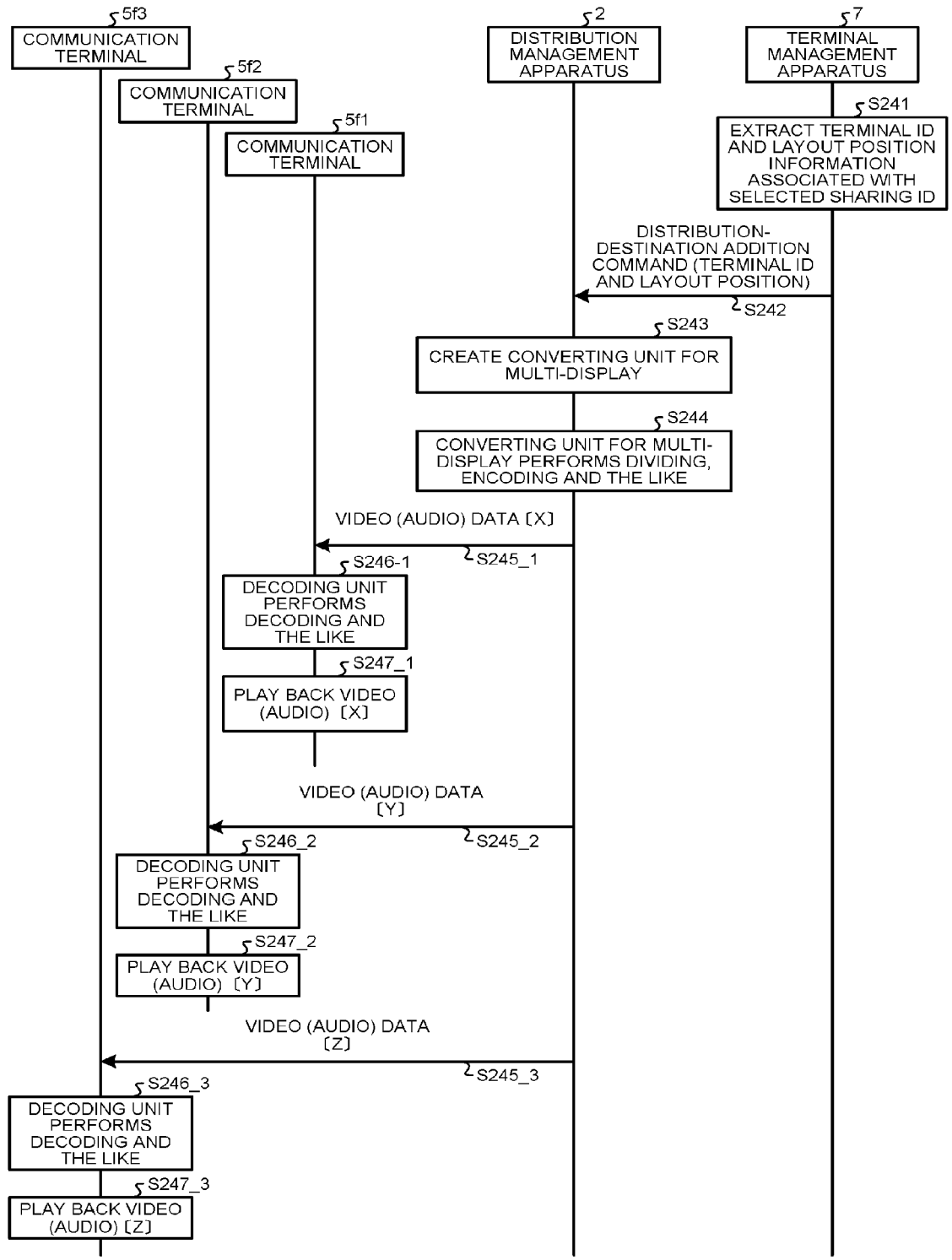
FIG. 22 is a sequence diagram illustrating the multi-display process.

A multi-display process is described below with reference to FIG. 20 to FIG. 22. FIG. 20 to FIG. 22 are sequence diagrams illustrating the process for the multi-display illustrated in FIG. 4. An example, in which video (audio) data [XYZ] being played back on the communication terminal 5a is divided and played back also on the communication terminals 5/1, 5/2, and 5/3, is described below. Herein, the browser 20 for displaying web content is denoted as "content browser 20a"; the browser 20 for displaying a setting screen for users is denoted as "setting browser 20b". Processing corresponding to Step S30 and subsequent steps is described below.

First, as illustrated in FIG. 20, the content browser 20a of the distribution management apparatus 2 renders the web content data [XYZ] acquired from the web server 8, thereby generating frame data, each piece of which is still-picture (audio) data, and outputs it to the transmission FIFO 24 (Step S201). The converting unit 10 of the encoder bridge unit 30 encodes the image (audio) data stored in the transmission FIFO 24, thereby performing conversion into video (audio) data [XYZ] of a data format distributable to the communication terminal 5a (Step S202).

Next, the transceiving unit 31 of the distribution management apparatus 2 transmits the video (audio) data [XYZ] converted by the converting unit 10 to the transceiving unit 51 of the communication terminal 5a (Step S203). It follows that the transceiving unit 51 of the communication terminal 5a receives the video (audio) data [XYZ] and outputs it to the playback control unit 53.

Next, in the communication terminal 5a, the decoding unit 50 acquires the video (audio) data [XYZ] from the playback control unit 53 and decodes it (Step S204). Thereafter, the speaker 61 plays back audio from the decoded audio data [XYZ], while the display unit 58 plays back a video from the video data [XYZ] acquired from the decoding unit 50 and rendered by the rendering unit 55 (Step S205).

Next, a user of the communication terminal 5a switches a screen displayed on the display unit 58 to a menu request screen (not shown). The operating unit 52 accepts depression of a "distribution-destination selection menu" button (not shown) on the menu request screen (Step S206). It follows that the transceiving unit 51 transmits a request for switching to the distribution-destination selection menu to the transceiving unit 71a of the terminal management apparatus 7 (Step S207). It follows that the transceiving unit 71a of the terminal management apparatus 7 receives the request for switching to the distribution-destination selection menu. This request contains the terminal ID of the communication terminal 5a.

Next, the transceiving unit 71b transmits a request for starting the setting browser 20b to the transceiving unit 21 of the distribution management apparatus 2 (Step S208). It follows that the transceiving unit 21 of the distribution management apparatus 2 receives the request for starting the setting browser 20b and requests the browser management unit 22 to start up the setting browser 20b.

Next, the browser management unit 22 starts up the setting browser 20b (Step S209). The creation/selection/transfer unit 310 of the encoder bridge unit 30 performs switching such that output to the converting unit 10 (e.g., the converting unit 10a) taken from the content browser 20a is switched to output to the converting unit 10 (e.g., the converting unit 10b) taken from the setting browser 20b (Step S210). In a case where the communication terminal 5a and another one (e.g., the communication terminal 5b) of the communication terminals 5 are receiving the video (audio) data at Step S203 described above while sharing the converting unit 10 (e.g., the converting unit 10a), the creation/selection/transfer unit 310 of the encoder bridge unit 30 newly creates the converting unit 10 (e.g., the converting unit 10b) because the other communication terminal 5 (e.g., the communication terminal 5b) is using the converting unit 10 (e.g., the converting unit 10a) for the content browser 20a.

The transceiving unit 21 transmits a request for the distribution-destination selection menu to the transceiving unit 71b of the terminal management apparatus 7 as instructed by the setting browser 20b (Step S211). At this time, the terminal ID of the communication terminal 5a is also transmitted. It follows that the transceiving unit 71b of the terminal management apparatus 7 receives the request for the distribution-destination selection menu and outputs the terminal ID of the communication terminal 5a to the storage unit 7000.

In response thereto, the storage unit 7000 of the terminal management apparatus 7 searches through the available-terminal management table 7020 by the terminal ID, thereby extracting a corresponding sharing ID(s) (Step S212). The sharing ID indicates the communication terminal 5 that is usable by the communication terminal 5a in remote sharing. For example, when the terminal ID assigned to the communication terminal 5a is "t001", sharing IDs "v003" and "v006" are extracted by searching through the available-terminal management table 7020 illustrated in FIG. 15.

Furthermore, the storage unit 7000 searches through the terminal management table 7010 by the extracted sharing ID, thereby extracting display name information indicating a corresponding display name(s) (Step S213). In this example, as illustrated in FIG. 14, display names associated with the extracted sharing IDs "v003" and "v006" are respectively "Tokyo Head Office, 10F, MFP" and "Osaka Exhibition Room, 1F, Multi-Display".

The transceiving unit 71b transmits, to the transceiving unit 21 of the distribution management apparatus 2, distribution-destination-selection-menu data [M] as content data (Step S214). It follows that the transceiving unit 21 of the distribution management apparatus 2 receives the distribution-destination-selection-menu data [M] and outputs it to the setting browser 20b. The distribution-destination-selection-menu data [M] is information for causing the distribution-destination selection menu screen illustrated in FIG. 13 to be displayed and contains checkboxes, sharing IDs, and display names.

Next, as illustrated in FIG. 21, the setting browser 20b renders the content data representing the distribution-destination-selection-menu data [M] acquired from the terminal management apparatus 7, thereby generating frame data, each piece of which is still-picture (audio) data, and outputs it to the transmission FIFO 24 (Step S221). The converting unit 10 of the encoder bridge unit 30 encodes the each piece of the frame data stored in the transmission FIFO 24, thereby performing conversion into video (audio) data [M] of a data format distributable to the communication terminal 5a (Step S222).

Next, the transceiving unit 31 transmits, to the transceiving unit 51 of the communication terminal 5a, the video (audio) data [M] converted by the converting unit 10 (Step S223). It follows that the transceiving unit 51 of the communication terminal 5a receives the video (audio) data [M] and outputs it to the playback control unit 53.

Next, in the communication terminal 5a, the decoding unit 50 acquires the video (audio) data [M] from the playback control unit 53 and decodes it (Step S224). Thereafter, the display unit 58 plays back a video of the distribution-destination selection menu screen illustrated in FIG. 13 from the video data [M] acquired from the decoding unit 50 and rendered by the rendering unit 55 (Step S225).

Next, when a checkbox of the sharing ID "v006" is marked and the "OK" button is pressed by the user on the distribution-destination selection menu screen illustrated in FIG. 13, the operating unit 52 accepts the operation entered by the user (Step S226).

Next, the transceiving unit 51 transmits a result of the marking as operation data [p] to the transceiving unit 31 of the distribution management apparatus 2 (Step S227). It follows that the transceiving unit 31 of the distribution management apparatus 2 receives the marking result as the operation data [p] and outputs it to the setting browser 20b.

Next, the setting browser 20b selects a sharing ID(s) on the basis of the marking result (Step S228). The transceiving unit 21 transmits a distribution-destination addition request to the transceiving unit 71b of the terminal management apparatus 7 as instructed by the setting browser 20b (Step S229). This distribution-destination addition request contains the sharing ID(s) selected at Step S228. It follows that the transceiving unit 71b of the terminal management apparatus 7 receives the distribution-destination addition request and outputs the sharing ID to the storage unit 7000. The setting browser 20b, which has completed its role, exits (Step S230). Thereafter, the creation/selection/transfer unit 310 of the encoder bridge unit 30 performs switching such that output to the converting unit 10 taken from the setting browser 20b is returned to output to the converting unit 10 taken from the content browser 20a (Step S231).

Next, as illustrated in FIG. 22, in the storage unit 7000 of the terminal management apparatus 7, by searching through the terminal management table 7010 by the sharing ID transmitted at Step S229, an associated terminal ID(s) and associated layout position information are extracted (Step S241). The transceiving unit 71b transmits a distribution-destination addition command to the transceiving unit 21 of the distribution management apparatus 2 (Step S242). This distribution-destination addition command contains the terminal ID(s) and the layout position information extracted at Step S241 described above. It follows that the transceiving unit 21 of the distribution management apparatus 2 receives the distribution-destination addition command and outputs the distribution-destination addition command to the browser management unit 22. It is assumed herein that three pairs of the terminal ID and the layout position information, which are the terminal ID "t006" and the layout position information "left", the terminal ID "t007" and the layout position information "middle", and the terminal ID "t008" and the layout position information "right", are contained.

Next, the creation/selection/transfer unit 310 of the encoder bridge unit 30 creates the converting unit 10 for the multi-display (Step S243). At this time, the creation/selection/transfer unit 310 of the encoder bridge unit 30 acquires the terminal ID(s) and the layout position information from the browser management unit 22. The dividing unit 13 of the converting unit 10 created at Step S243 described above divides the frame data [XYZ], each piece of which is still-picture (audio) data, stored in the transmission FIFO 24. The encoding unit 19 encodes each of the divided pieces of frame data (Step S244).

The transceiving unit 31 transmits video (audio) data [X] encoded by the encoder bridge unit 30 to the transceiving unit 51 of the communication terminal 5/1 in accordance with the terminal ID ("t006") and the layout position information ("left") (Step S245_1). It follows that the transceiving unit 51 of the communication terminal 5/1 receives the video (audio) data [X] and outputs it to the playback control unit 53.

Next, in the communication terminal 5/1, the decoding unit 50 acquires the video (audio) data [X] from the playback control unit 53 and decodes it (Step S246_1). Thereafter, the speaker 61 plays back audio from the decoded audio data [X], while the display unit 58 plays back a video from the video data [X] acquired from the decoding unit 50 and rendered by the rendering unit 55 (Step S247_1).

Similarly, the transceiving unit 31 transmits video (audio) data [Y] encoded by the encoder bridge unit 30 to the transceiving unit 51 of the communication terminal 5/2 in accordance with the terminal ID ("t007") and the layout position information ("middle") (Step S245_2). It follows that the transceiving unit 51 of the communication terminal 5/2 receives the video (audio) data [Y] and outputs it to the playback control unit 53.

Next, in the communication terminal 5/2, the decoding unit 50 acquires the video (audio) data [Y] from the playback control unit 53 and decodes it (Step S246_2). Thereafter, the speaker 61 plays back audio from the decoded audio data [Y], while the display unit 58 plays back a video from the video data [Y] acquired from the decoding unit 50 and rendered by the rendering unit 55 (Step S247_2).

Further similarly, the transceiving unit 31 transmits video (audio) data [Z] encoded by the encoder bridge unit 30 to the transceiving unit 51 of the communication terminal 5/3 in accordance with the terminal ID ("t008") and the layout position information ("right") (Step S245_3). It follows that the transceiving unit 51 of the communication terminal 5/3 receives the video (audio) data [Z] and outputs it to the playback control unit 53.

Next, in the communication terminal 5/3, the decoding unit 50 acquires the video (audio) data [Z] from the playback control unit 53 and decodes it (Step S246_3). Thereafter, the speaker 61 plays back audio from the decoded audio data [Z], while the display unit 58 plays back a video from the video data [Z] acquired from the decoding unit 50 and rendered by the rendering unit 55 (Step S247_3).

<Zoom-In Display Process Exploiting Multi-Display>

Figure 23:
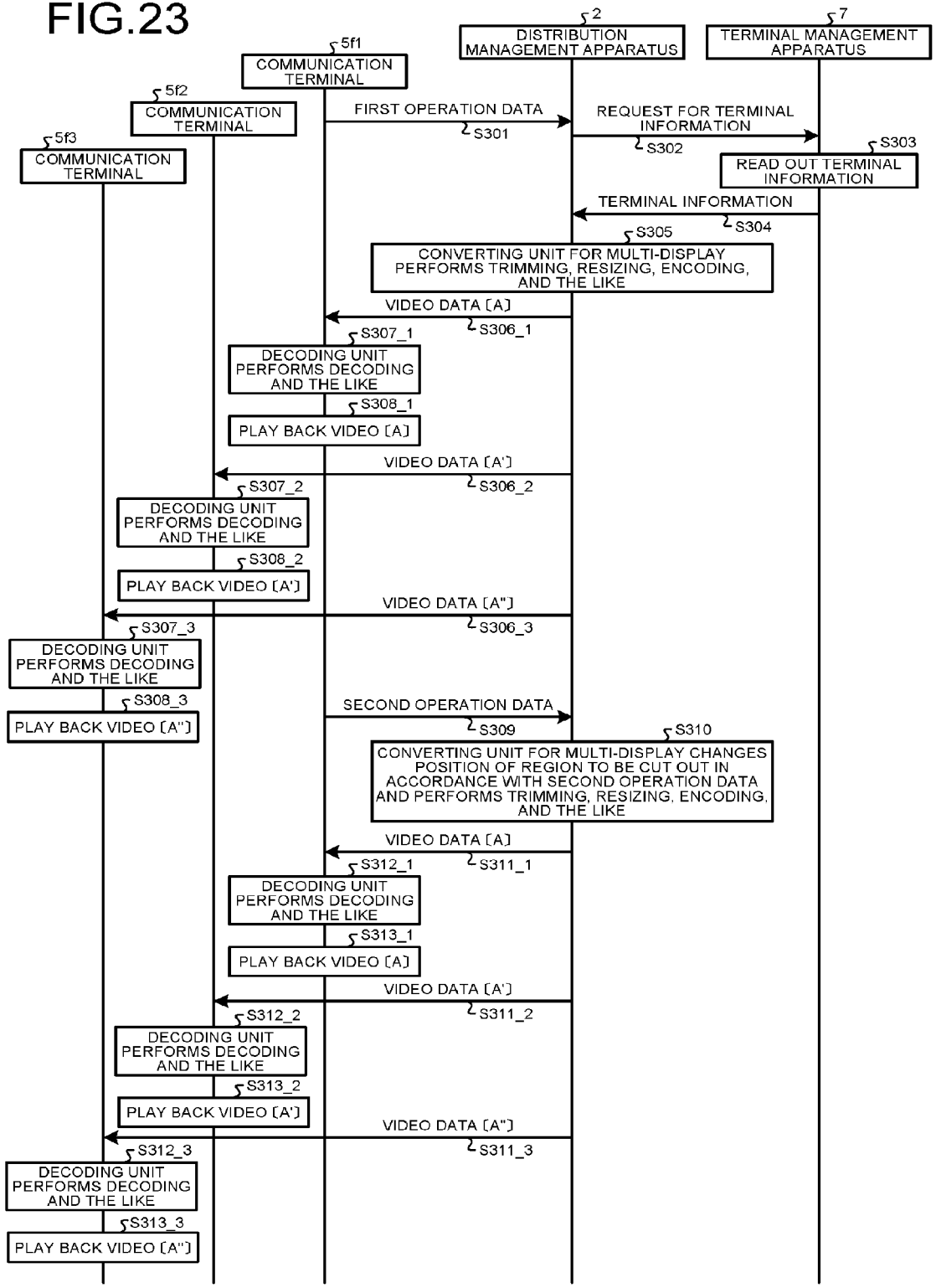
FIG. 23 is a sequence diagram illustrating a zoom-in process exploiting the multi-display.

A zoom-in display process exploiting the multi-display is described below with reference to FIG. 23. FIG. 23 is a sequence diagram illustrating the zoom-in display process exploiting the multi-display illustrated in FIG. 5. Illustrated is an example in which, in a situation where the video [A] being played back on the communication terminal 5/1 is distributed to and played back also on the communication terminals 5/1, 5/2, and 5/3, an operation, performed by a user, of zooming into and displaying a partial region of the video [A] being displayed on the communication terminal 5/1 is accepted, and videos [A'] and [A"] of the region are played back and displayed in a zoomed-in manner on the communication terminals 5/2 and 5/3. A process similar to the multi-display process illustrated in FIG. 20 to FIG. 22 is performed also in this example. Description about processing similar to that in the multi-display process illustrated in FIG. 20 to FIG. 22 is omitted, and processing following Step S247_1, Step S247_2, and Step S247_3 of FIG. 22 is described. Note that, in this example, the video data [A] is not divided but undergoes encoding and the like at Step S244 of FIG. 22, and the video data [A] is transmitted to the communication terminals 5/1, 5/2, and 5/3 at Step S245_1, Step S245_2, and Step S245_3, respectively. The video data [A] is decoded by the decoding unit 50 of each of the communication terminals 5/1, 5/2, and 5/3 at a corresponding one of Step S246_1, Step S246_2, and Step S246_3. The video [A] is displayed on the display unit 58 of each of the communication terminals 5/1, 5/2, and 5/3 at a corresponding one of Step S247_1, Step S247_2, and Step S247_3. It is assumed that the communication terminal 5/1 acquires terminal information about the communication terminals 5/2 and 5/3 from the terminal management apparatus 7 and stores it in the storage unit 7000 in advance. The description below is made on an assumption that the terminal management table 7010 illustrated in FIG. 14 is stored in the storage unit 7000.

First, when an operation aimed at zooming into and displaying a portion of the video [A] displayed on the display unit 58 of the communication terminal 5/1 is performed by a user by using the operating unit 52 of the communication terminal 5/1, this operation is accepted by the operating unit 52. The transceiving unit 51 of the communication terminal 5/1 transmits first operation data indicating the operation of zooming into and displaying the portion of the video [A] to the transceiving unit 31 of the distribution management apparatus 2 (Step S301). It follows that the transceiving unit 31 of the distribution management apparatus 2 receives the first operation data and outputs it to the browser management unit 22.

Next, when the browser management unit 22 acquires the first operation data from the transceiving unit 31, the transceiving unit 21 transmits, to the transceiving unit 71b of the terminal management apparatus 7, a request for terminal information with designation by the terminal IDs of the communication terminals 5/2 and 5/3 (Step S302). It follows that the transceiving unit 71b of the terminal management apparatus 7 receives the request for terminal information and outputs the terminal IDs of the communication terminals 5/2 and 5/3 to the storage unit 7000. The storage unit 7000 reads out resolution information (1920*1080 and 1920*1080) and selected coordinate information ((600100) and (6002400)) associated with the terminal IDs of the communication terminals 5/2 and 5/3 by searching through the terminal management table 7010 by the terminal IDs of the communication terminals 5/2 and 5/3 (Step S303). The transceiving unit 71b of the terminal management apparatus 7 transmits the terminal information (terminal-by-terminal terminal information regarding the communication terminals 5/2 and 5/3) containing the resolution information and the selected coordinate information read out from the terminal management table 7010 to the transceiving unit 21 of the distribution management apparatus 2 as a response to the request submitted at Step S302 (Step S304). It follows that the transceiving unit 21 of the distribution management apparatus 2 receives the terminal information (the terminal-by-terminal terminal information regarding the communication terminals 5/2 and 5/3) containing the resolution information and the selected coordinate information and outputs it to the browser management unit 22.

Next, the converting unit 10 for the multi-display created at Step S243 of FIG. 22 acquires the resolution information and the selected coordinate information regarding the communication terminals 5/2 and 5/3 from the browser management unit 22 and performs trimming, resizing, encoding, and the like on each piece of the frame data [A] rendered by the browser 20 using the resolution information and the selected coordinate information regarding the communication terminals 5/2 and 5/3 (Step S305). Specifically, in the converting unit 10 assigned to the communication terminal 5/2, the trimming unit 11 cuts out a region [A'] of a size that depends on the resolution information regarding the communication terminal 5/2 from each piece of the frame data [A] rendered by the browser 20 in accordance with the selected coordinate information. Similarly, in the converting unit 10 assigned to the communication terminal 5/3, the trimming unit 11 cuts out a region [A"] of a size that depends on the resolution information regarding the communication terminal 5/3 from each piece of the frame data [A] rendered by the browser 20 in accordance with the selected coordinate information. In each of the converting units 10, the resizing unit 12 performs resizing and the like on each piece of the frame data [A], [A'], and [A"] as required depending on the resolution of the communication terminal 5, and the encoding unit 19 encodes each piece of the frame data [A], [A'], and [A"].

The transceiving unit 31 transmits the video data [A], on which the encoding and the like is performed by the converting unit 10 assigned to the communication terminal 5/1, to the transceiving unit 51 of the communication terminal 5/1 (Step S306_1). It follows that the transceiving unit 51 of the communication terminal 5/1 receives the video data [A] and outputs it to the playback control unit 53.

Next, in the communication terminal 5/1, the decoding unit 50 acquires the video data [A] from the playback control unit 53 and decodes it (Step S307_1). Thereafter, the display unit 58 plays back the video [A] from the video data [A] acquired from the decoding unit 50 and rendered by the rendering unit 55 (Step S308_1). Hence, the display unit 58 of the communication terminal 5/1 continues displaying the video [A]. At this time, the display unit 58 of the communication terminal 5/1 displays guide frames indicating the regions to be zoomed in and displayed on the communication terminals 5/2 and 5/3 by superimposing the guide frames on the video [A] on the basis of the resolution information and the selected coordinate information contained in the terminal information regarding the communication terminals 5/2 and 5/3 acquired from the terminal management apparatus 7 and stored in the storage unit 5000 in advance.

The transceiving unit 31 of the distribution management apparatus 2 transmits the video data [A'], on which the encoding and the like is performed by the converting unit 10 assigned to the communication terminal 5/2, to the transceiving unit 51 of the communication terminal 5/2 (Step S306_2). It follows that the transceiving unit 51 of the communication terminal 5/2 receives the video data [A'] and outputs it to the playback control unit 53.

Next, in the communication terminal 5/2, the decoding unit 50 acquires the video data [A'] from the playback control unit 53 and decodes it (Step S307_2). Thereafter, the display unit 58 plays back the video [A'] from the video data [A'] acquired from the decoding unit 50 and rendered by the rendering unit 55 (Step S308_2). Hence, the display unit 58 of the communication terminal 5/2 displays the zoomed-in video [A'] of the partial region (the region surrounded by the guide frame associated with the communication terminal 5/2) of the video [A] displayed on the display unit 58 of the communication terminal 5/1.

Similarly, the transceiving unit 31 of the distribution management apparatus 2 transmits the video data [A"], on which the encoding and the like is performed by the converting unit 10 assigned to the communication terminal 5/3, to the transceiving unit 51 of the communication terminal 5/3 (Step S306_3). It follows that the transceiving unit 51 of the communication terminal 5/3 receives the video data [A"] and outputs it to the playback control unit 53.

Next, in the communication terminal 5/3, the decoding unit 50 acquires the video data [A"] from the playback control unit 53 and decodes it (Step S307_3). Thereafter, the display unit 58 plays back the video [A"] from the video data [A"] acquired from the decoding unit 50 and rendered by the rendering unit 55 (Step S308_3). Hence, the display unit 58 of the communication terminal 5/3 displays the zoomed-in video [A"] of the partial region (the region surrounded by the guide frame associated with the communication terminal 5/3) of the video [A] displayed on the display unit 58 of the communication terminal 5/1.

Next, when an operation of moving the guide frame (in this example, the guide frame associated with the communication terminal 5/2) on the video [A] displayed on the display unit 58 of the communication terminal 5/1 is performed by the user by using the operating unit 52 of the communication terminal 5/1, this operation is accepted by the operating unit 52. The transceiving unit 51 of the communication terminal 5/1 transmits second operation data containing a distance and direction traveled by the guide frame to the transceiving unit 31 of the distribution management apparatus 2 (Step S309). It follows that the transceiving unit 31 of the distribution management apparatus 2 receives the second operation data and outputs it to the browser management unit 22.

Next, when the browser management unit 22 receives the second operation data from the transceiving unit 31, the converting unit 10 for the multi-display created at Step S243 of FIG. 22 acquires, from the browser management unit 22, the distance and direction traveled by the guide frame indicated by the second operation data transmitted from the communication terminal 5/1. The converting unit 10 for the multi-display performs trimming, resizing, encoding, and the like on each piece of the frame data [A] rendered by the browser 20 while changing the region to be cut out using the distance and direction traveled by the guide frame (Step S310). Specifically, in a case where the guide frame moved by the user on the video [A] displayed on the display unit 58 of the communication terminal 5/1 is associated with the communication terminal 5/2, the trimming unit 11 of the converting unit 10 assigned to the communication terminal 5/2 changes the position of the region [A'] to be cut out from each piece of the frame data [A] rendered by the browser 20 in accordance with the distance and direction traveled by the guide frame while maintaining its size. In each of the converting units 10, the resizing unit 12 performs resizing and the like on each piece of the video data [A], [A'], and [A"] as required depending on the resolution of the communication terminal 5, and the encoding unit 19 encodes each piece of the frame data [A], [A'], and [A"].

The transceiving unit 31 transmits the video data [A], on which the encoding and the like performed by the converting unit 10 assigned to the communication terminal 5/1, to the transceiving unit 51 of the communication terminal 5/1 (Step S311_1). It follows that the transceiving unit 51 of the communication terminal 5/1 receives the video data [A] and outputs it to the playback control unit 53.

Next, in the communication terminal 5/1, the decoding unit 50 acquires the video data [A] from the playback control unit 53 and decodes it (Step S312_1). Thereafter, the display unit 58 plays back the video [A] from the video data [A] acquired from the decoding unit 50 and rendered by the rendering unit 55 (Step S313_1). Hence, the display unit 58 of the communication terminal 5/1 continues displaying the video [A].

The transceiving unit 31 of the distribution management apparatus 2 transmits the video data [A'], on which the encoding and the like is performed by the converting unit 10 assigned to the communication terminal 5/2, to the transceiving unit 51 of the communication terminal 5/2 (Step S311_2). It follows that the transceiving unit 51 of the communication terminal 5/2 receives the video data [A'] and outputs it to the playback control unit 53.

Next, in the communication terminal 5/2, the decoding unit 50 acquires the video data [A'] from the playback control unit 53 and decodes it (Step S312_2). Thereafter, the display unit 58 plays back the video [A'] from the video data [A'] acquired from the decoding unit 50 and rendered by the rendering unit 55 (Step S313_2). Hence, the display unit 58 of the communication terminal 5/2 displays the zoomed-in video [A'] of the region surrounded by the guide frame having been moved in accordance with the user's operation on the video [A] displayed on the display unit 58 of the communication terminal 5/1.

Similarly, the transceiving unit 31 of the distribution management apparatus 2 transmits the video data [A"], on which the encoding and the like is performed by the converting unit 10 assigned to the communication terminal 5/3, to the transceiving unit 51 of the communication terminal 5/3 (Step S311_3). It follows that the transceiving unit 51 of the communication terminal 5/3 receives the video data [A"] and outputs it to the playback control unit 53.

Next, in the communication terminal 5/3, the decoding unit 50 acquires the video data [A"] from the playback control unit 53 and decodes it (Step S312_3). Thereafter, the display unit 58 plays back the video [A"] from the video data [A"] acquired from the decoding unit 50 and rendered by the rendering unit 55 (Step S313_3). Hence, the display unit 58 of the communication terminal 5/3 continues displaying the zoomed-in video [A"] of the partial region (the region surrounded by the guide frame associated with the communication terminal 5/3) of the video [A] displayed on the display unit 58 of the communication terminal 5/1.

In the above-described example, the creation/selection/transfer unit 310 of the encoder bridge unit 30 creates the converting unit 10 for the multi-display before the user performs the operation of zooming into a portion of the video (before the first operation data is transmitted to the distribution management apparatus 2). Alternatively, a configuration, in which the converting unit 10 for the multi-display is created after the first operation data is transmitted to the distribution management apparatus 2, may be employed.

Main Effects of Embodiment

As described above in detail by way of concrete examples, in the distribution system 1 of the present embodiment, the distribution management apparatus 2 on the cloud includes the browser 20 and the encoder bridge unit 30, which performs encoding and the like. The browser 20 generates frame data by rendering content data described in a predetermined description language. The encoder bridge unit 30 performs encoding and the like on the frame data, thereby performing conversion into video (audio) data of a data format distributable to the communication terminal 5 via the communication network 9. When first operation data indicating an operation of zooming into a partial region of a video being played back is received from one (a first communication terminal) of the plurality of communication terminals 5, to which video data is distributed, the encoder bridge unit 30 cuts out a region, which is a partial region of the frame data rendered by the browser 20 and of which size depends on the display/playback capabilities (e.g., resolution) of another one (a second communication terminal) of the communication terminals 5, converts frame data representing the cut-out region into video data, and distributes the video data to the second communication terminal.

Thus, in the distribution system 1 of the present embodiment, when an operation of zooming into a partial region of a whole video generated from content data is performed, the partial region is displayed on another one (the second communication terminal) of the communication terminals 5 than the communication terminal 5 (the first communication terminal) displaying the whole video in a fashion that depends on the display/playback capabilities of the other one of the communication terminals 5. Therefore, it is possible to cause the communication terminals 5 to display a whole video of content and simultaneously to display a desired portion of the content in an easy-to-view manner.

Furthermore, in the distribution system 1 of the present embodiment, the communication terminal 5 (the first communication terminal) that displays the whole video displays a guide frame indicating the region to be zoomed in and displayed on the other one (the second communication terminal) of the communication terminals 5 by superimposing the guide frame on the video. The region to be zoomed in and displayed on the other one (the second communication terminal) of the communication terminals 5 is changed within the whole video in accordance with an operation performed on the guide frame. Thus, a user can specify a desired portion of content through intuitive operations, and therefore a high level of operability can be achieved.

MODIFICATIONS

In the distribution system 1 of the present embodiment, the terminal management apparatus 7 and the distribution management apparatus 2 are configured as separate apparatuses. Alternatively, the terminal management apparatus 7 and the distribution management apparatus 2 may be configured in a single apparatus by imparting the functions of the terminal management apparatus 7 to the distribution management apparatus 2, for example.

The distribution management apparatus 2 and the terminal management apparatus 7 of the above embodiment may be implemented in a single computer or may be implemented in a plurality of computers by dividing the units (the functions, means, or the storage units) and allocating the units as desired to the computers.

Each of recording media, such as CD-ROMs, in which programs of the embodiment are stored, and the HDD 204, in which the programs are stored, can be provided domestically or abroad as program products.

CITATION LIST

Patent Literature

Patent Literature 1: Japanese Laid-open Patent Application No. 2002-268969

The invention claimed is:

1. A distribution management apparatus configured to communicate via a network with a first communication terminal, a second communication terminal, a third communication terminal, and a terminal management apparatus that manages terminal information of the first to third communication terminals, and to transmit video data to the first to third communication terminals, the distribution management apparatus comprising:

processing circuitry configured to acquire the terminal information of the first to third communication terminals from the terminal management apparatus, the terminal information containing resolution information indicating resolution of the first to third communication terminals and selected coordinate information indicating an initial position where a guide frame is to be displayed on the first communication terminal as being superimposed, the guide frame being a partial region to be zoomed in of video data being played back and displayed on the first communication terminal in response to an operation from a user, and a size of the guide frame depends on the display/playback capabilities of the second communication terminal or third communication terminal so that the frame is superimposed on the video data being played back and displayed, and an operation of moving the guide frame on the video data causes the processing circuitry to acquire the terminal information of the first to third communication terminals from the terminal management apparatus, and provide at least three converters for the first to third communication terminals, respectively, each converter being configured to define a size and an initial position of a region to be cut out based on the resolution information and the selected coordinate information for the corresponding communication terminal and to cut out the region from video data; and a transmitter configured to transmit video data of the cut-out region to the corresponding one of the second and third communication terminals.

2. The distribution management apparatus according to claim 1, wherein the processing circuitry generates frame data as still-picture data by rendering content data, and converts the frame data into the video data distributable to the second communication terminal and the third communication terminal by encoding the frame data.

3. The distribution management apparatus according to claim 2, wherein the processing circuitry acquires the content data described in a predetermined description language to generate the frame data.

4. The distribution management apparatus according to claim 2, wherein the processing circuitry controls display of a web browser, and encodes the frame data generated by the web browser.

5. A distribution method to be performed in a distribution management apparatus configured to communicate via a network with a first communication terminal, a second communication terminal, a third communication terminal, and a terminal management apparatus that manages terminal information of the first to third communication terminals, and to transmit video data to the first to third communication terminals, the distribution method comprising:

acquiring, by processing circuitry of the distribution management apparatus, the terminal information of the first to third communication terminals from the terminal management apparatus, the terminal information containing resolution information indicating resolution of the first to third communication terminals and selected coordinate information indicating an initial position where a guide frame is to be displayed on the first communication terminal as being superimposed, the guide frame being a partial region to be zoomed in of video data being played back and displayed on the first communication terminal in response to an operation from a user, and a size of the guide frame depends on the display/playback capabilities of the second communication terminal or third communication terminal so that the frame is superimposed on the video data being played back and displayed, and an operation of moving the guide frame on the video data causes the processing circuitry to acquire the terminal information of the first to third communication terminals from the terminal management apparatus;

providing, by the processing circuitry, at least three converters for the first to third communication terminals, respectively, each converter defining a size and an initial position of a region to be cut out based on the resolution information and the selected coordinate information for the corresponding communication terminal and cutting out the region from video data; and transmitting, by a transmitter, video data of the cut-out region to the corresponding one of the second and third communication terminals.

6. A non-transitory computer-readable storage medium with an executable program stored thereon and executed by a distribution management apparatus configured to communicate via a network with a first communication terminal, a second communication terminal, a third communication terminal, and a terminal management apparatus that manages terminal information of the first to third communication terminals, and to transmit video data to the first to third communication terminals, wherein the program instructs the distribution management apparatus to perform:

acquiring, by processing circuitry of the distribution management apparatus, the terminal information of the first to third communication terminals from the terminal management apparatus, the terminal information containing resolution information indicating resolution of the first to third communication terminals and selected coordinate information indicating an initial position where a guide frame is to be displayed on the first communication terminal as being superimposed, the guide frame being a partial region to be zoomed in of video data being played back and displayed on the first communication terminal in response to an operation from a user, and a size of the guide frame depends on the display/playback capabilities of the second communication terminal or third communication terminal so that the frame is superimposed on the video data being played back and displayed, and an operation of moving the guide frame on the video data causes the processing circuitry to acquire the terminal information of the first to third communication terminals from the terminal management apparatus;

providing at least three converters for the first to third communication terminals, respectively, each converter defining a size and an initial position of a region to be cut out based on the resolution information and the selected coordinate information for the corresponding communication terminal and cutting out the region from video data; and transmitting video data of the cut-out region to the corresponding one of the second and third communication terminals.

* * * * *